US010550727B2

(12) United States Patent
Waki

(10) Patent No.: US 10,550,727 B2
(45) Date of Patent: Feb. 4, 2020

(54) METHOD FOR MOUNTING OR DISMOUNTING TURBINE COMPONENT, DEVICE FOR EXECUTING THE METHOD, AND METHOD FOR INSTALLING THE DEVICE

(71) Applicant: MITSUBISHI HITACHI POWER SYSTEMS, LTD., Kanagawa (JP)

(72) Inventor: Kunihiko Waki, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 392 days.

(21) Appl. No.: 15/319,968

(22) PCT Filed: Jun. 9, 2015

(86) PCT No.: PCT/JP2015/066642
§ 371 (c)(1),
(2) Date: Dec. 19, 2016

(87) PCT Pub. No.: WO2015/198858
PCT Pub. Date: Dec. 30, 2015

(65) Prior Publication Data
US 2017/0138218 A1 May 18, 2017

(30) Foreign Application Priority Data

Jun. 26, 2014 (JP) ................. 2014-131542

(51) Int. Cl.
*F01D 25/28* (2006.01)
*F01D 25/16* (2006.01)
(Continued)

(52) U.S. Cl.
CPC .......... *F01D 25/285* (2013.01); *F01D 25/16* (2013.01); *F02C 7/04* (2013.01); *B23P 15/008* (2013.01);
(Continued)

(58) Field of Classification Search
CPC ..... B23P 15/008; B23P 19/12; B23P 2700/13; F05B 2230/70; F05B 2230/80;
(Continued)

(56) References Cited

U.S. PATENT DOCUMENTS 3,283,923 A * 11/1966 Schnyder ................. E04B 7/16
212/166
3,961,712 A * 6/1976 Bartley ................... B66C 17/00
212/315
2007/0033795 A1* 2/2007 McCaffrey ............. B66C 11/04
29/464

FOREIGN PATENT DOCUMENTS

JP           4-94390       8/1992
JP         2001-107745    4/2001
(Continued)

OTHER PUBLICATIONS

International Search Report dated Sep. 15, 2015 in International Application No. PCT/JP2015/066642 (with English translation).
(Continued)

*Primary Examiner* — Jason L Vaughan
(74) *Attorney, Agent, or Firm* — Wenderoth, Lind & Ponack, L.L.P.

(57) ABSTRACT

A hanging device of a component of a turbine includes: a bridge member that bridges upper ends of a pair of side wall plates facing each other with the turbine interposed therebetween, among plates which constitute an enclosure surrounding an outer periphery of the turbine, and has a traveling path; and a hanging tool that hangs the component of the turbine and travels along the traveling path.

19 Claims, 18 Drawing Sheets

(51) Int. Cl.
    *F02C 7/04*          (2006.01)
    *B23P 15/00*        (2006.01)
    *B23P 19/12*        (2006.01)

(52) U.S. Cl.
    CPC .......... *B23P 19/12* (2013.01); *F05D 2220/32* (2013.01); *F05D 2230/70* (2013.01); *F05D 2230/72* (2013.01); *Y10T 29/4932* (2015.01); *Y10T 29/49323* (2015.01)

(58) Field of Classification Search
    CPC ............. F05B 2230/60; F05D 2230/60; F05D 2230/70; F05D 2230/72; F05D 2230/80; F05D 2230/68; Y10T 29/49323; Y10T 29/4932
    See application file for complete search history.

(56) References Cited

FOREIGN PATENT DOCUMENTS

| | | |
|---|---|---|
| JP | 2009-174331 | 8/2009 |
| JP | 2009-203925 | 9/2009 |

OTHER PUBLICATIONS

Written Opinion of the International Searching Authority dated Sep. 15, 2015 in International Application No. PCT/JP2015/066642 (with English translation).

\* cited by examiner

FRONT SIDE ←— Da —→ REAR SIDE

METHOD FOR MOUNTING OR DISMOUNTING TURBINE COMPONENT, DEVICE FOR EXECUTING THE METHOD, AND METHOD FOR INSTALLING THE DEVICE

TECHNICAL FIELD

The present invention relates to a method for mounting or dismounting a component of a turbine covered with an enclosure, a device for executing the method, and a method for installing the device.

Priority is claimed on Japanese Patent Application No. 2014-131542, filed Jun. 26, 2014, the content of which is incorporated herein by reference.

BACKGROUND ART

A gas turbine generally includes a compressor that compresses air, a combustor that generates combustion gas by combusting fuel in the air compressed in the compressor, and a turbine that is driven by the combustion gas. An intake duct is connected to the compressor. The gas turbine is disposed in a turbine building. The gas turbine is covered with an enclosure in the turbine building.

The following Patent Literature 1 discloses a method for disassembling apart of an intake duct, using an overhead crane mounted in the turbine building, and inspecting a bearing of a gas turbine located vertically below the intake duct.

CITATION LIST

Patent Literature

[Patent Literature 1]
Japanese Unexamined Patent Application, First Publication No. 2001-107745

SUMMARY OF INVENTION

Technical Problem

In the technique described in Patent Literature 1, since an overhead crane is used in the course of mounting and dismounting the components of the gas turbine, in particular, when moving the components, an occupancy time of the overhead crane increases in the repair and inspection processes, including the mounting and dismounting process of the components. Moreover, in the technique described in Patent Literature 1, for example, it is not possible to perform the repair and inspection of the exhaust-side components of the gas turbine together with the repair and inspection of the intake-side components of the gas turbine. Therefore, in the technique described in Patent Literature 1, there is a problem of an increase in time required for repair and inspection processes of the gas turbine.

Accordingly, an object of the present invention is to provide a technique that is capable of shortening the time required for repair and inspection processes of the turbine.

Solution to Problem

A hanging device of a component as an aspect according to the present invention for solving the aforementioned problems includes: a bridge member that bridges upper ends of a pair of side wall plates facing each other with a turbine interposed, therebetween, among plates which constitute an enclosure surrounding an outer periphery of the turbine, and has a traveling path; and a hanging tool that hangs the component of the turbine and travels along the traveling path.

It is possible to move the turbine component by the use of the hanging device, even without using the overhead crane. Therefore, by using the hanging device, it is possible to considerably shorten the occupancy time of the overhead crane in the course of repair and inspection of the component, and furthermore, for example, by the combined use of the hanging device and the overhead crane, it is possible to perform repair and inspection of the exhaust-side component of the turbine in parallel with repair and inspection of the intake-side component of the turbine.

Here, the hanging device of the component may include a leg member that is disposal on each of the upper ends of the pair of side wall plates, supports the bridge member, and adjusts the height of the bridge member.

In the hanging device, the height of the bridge member can be set to a desired height. Thus, the height of the traveling path of the bridge member, and the height of the hanging tool, mounted on the traveling path can be set to the desired height.

In the hanging device of the component including the leg member, the leg member may have a flange portion that regulates the movement in a lateral direction in which the pair of side wall plates are arranged.

In the hanging device, even if a lateral load is applied to the leg member or the bridge member supported by the leg member, it is possible to prevent the leg member from deviating in the lateral direction from the upper end of the side wall plate.

The hanging device of the component including the leg member may include a pedestal which is disposed between the leg member and the upper end of the side wall plate, and of which a central portion in the lateral direction in which the pair of side wall plates are arranged gently protrudes upward.

In the hanging device, even if the leg member is slightly tilted, it is possible to reduce a stress concentration on the leg member or the corner of the upper end of the side wall plate.

In any one of the above hanging devices of the component, the traveling path may have a lateral path that extends in the lateral direction in which the pair of side wall plates are arranged.

In the hanging device, it is possible to move the component that is hung by the hanging tool in the lateral direction.

In any one of the above hanging devices of the component, the traveling path may have an axial path that extends in the axial direction which is a direction in which a rotational axis of the turbine extends.

In the hanging device, it is possible to move the component that is hung by hanging tool in the axial direction.

Further, in any one of the above hanging devices of the component, the traveling path may have a lateral path extending in the lateral direction in which the pair of side wall plates are arranged, an axial path extending in the axial direction which is a direction in which the rotational axis of the turbine extends, and a connecting path that connects the lateral path and the axial path such that the hanging tool is movable between the lateral path and the axial path.

In the hanging device, it is possible to move the component that is hung by the hanging tool in the lateral direction and the axial direction.

In the hanging device of the component having the connecting path, the lateral path, the axial path, and the connecting path may be provided on the same virtual plane, and the hanging device may include a connecting path rotation support portion that supports the connecting path so as to be rotatable on an axis perpendicular to the virtual, plane around an intersection point between an extension line of the lateral path and an extension line of the axial path.

In any one of the above hanging devices of the component, the bridge member may have a lateral beam member which extends in the lateral direction in which the pair of side wall plates are arranged and bridges the upper ends of the pair of side wall plates, and to which the traveling path is mounted.

In the hanging device of the component having the axial path, the bridge member may have a lateral beam member that extends in the lateral direction in which the pair of side wall plates are arranged and bridges the upper ends of the pair of side wall plates, and an axial beam member which is mounted on the lateral beam member and extends in the axial direction, and to which the axial path is mounted.

The hanging device of the component having the axial beam member may further include an axial beam support seat that is fixed to the inner surface of the intake duel of the turbine to support an end of the axial beam member.

In the hanging device, when the hanging tool is axially moved inside the intake duct along the axial path, it is possible to stably support the bridge member by supporting an end of the axial beam member, on which the axial path is mounted, with the axial beam support seat.

According to another aspect of the invention for solving the aforementioned problems, there is provided a method for installing the hanging device of the component including the axial beam member, the method including: an enclosure disassembling process of exposing the upper ends of the pair of side wall plates by dismounting at least a part of an upper enclosure of the enclosure covering an upper portion of the turbine; an opening process of forming an opening in a part of a rear plate of a front plate and the rear plate of the intake duct facing each other in the axial direction by dismounting a part of the near plate above the rotational axis; a seat arranging process of fixing the axial beam support seat to an inner surface which is a surface of the front plate on the rear plate side; an inserting process of partially inserting the axial beam member and the axial path into the intake duct from the opening; an end supporting process of placing the end of the axial beam member inserted into the intake duct on the axial beam support seat; and a lateral beam member arranging process of arranging the lateral beam member to bridge the upper ends of the pair of side wall plates.

According to still another aspect of the invention for solving the aforementioned problems, there is provided a method for mounting or dismounting a component of a turbine covered with an enclosure, the method including: an enclosure disassembling process of exposing upper ends of a pair of side wall plates facing each other with the turbine interposed therebetween by dismounting at least a part of an upper enclosure of the enclosure covering an upper portion of the turbine; a bridge member arranging process of arranging a bridge member having a traveling path to bridge the upper ends of the pair of the side wall plates; and a component moving process of hanging the component to a hanging tool capable of traveling along the traveling path, moving the hanging tool along the traveling path, and moving the component that is hung by the hanging tool.

In the method for mounting or dismounting the component, the bridge member arranging process may include a height adjusting process of adjusting the height of the bridge member by placing a leg member configured to support the bridge member on each of the upper ends of the pair of side wall plates.

In any one of the above methods for mounting or dismounting the component, the traveling path may have a lateral path that extends in the lateral direction in which the pair of side wall plates are arranged, and the hanging tool may be moved along the lateral path in the component moving process.

In any one of the above methods for mounting or dismounting the component, the traveling path may have an axial path that extends in the axial direction which is a direction in which the rotational axis of the turbine extends, and the hanging tool may be moved along the axial path in the component moving process.

In any one of the above methods for mounting or dismounting the component, the traveling path may have a lateral path extending in the lateral direction in which the pair of side wall plates are arranged, an axial path extending in the axial direction which is a direction in which the rotational axis of the turbine extends, and a connecting path that connects the lateral path and the axial path such that the hanging tool is movable between the lateral path and the axial path, and the hanging tool may be moved along the lateral path, the connecting path, and the axial path in the component moving process.

In the method for mounting or dismounting the component in which the hanging tool is moved along the lateral path, the connecting path, and the axial path in the component moving process, the bridge member may have a lateral beam member that extends in the lateral direction and bridges the upper ends of the pair of side wall plates, and an axial beam member which is fixed to the lateral beam member and extends in the axial direction, and to which the axial path is mounted. Plates which form the intake duct of the turbine may include a front plate and a rear plate facing each other in the axial direction. The bridge member arranging process may include: an opening process of forming an opening in a part of the rear plate by dismounting a part of the rear plate above the rotational axis; an inserting process of partially inserting the axial path and the axial beam member into the intake duct tram the opening; an end supporting process of supporting the end of the axial beam member inserted into the intake duct on the front plate; and a lateral beam member arranging process of arranging the lateral beam member to bridge the upper ends of the pair of side wall plates.

Further, in the method for mounting or dismounting the component including the end supporting process, the bridge member arranging process may include a seat arranging process of fixing the axial beam support seat on the inner surface of the intake duct that is the surface of the front plate on the rear plate side, and the end of the axial beam member inserted into the intake duct may be placed on the axial beam support seat in the end supporting process.

Advantageous Effects of Invention

In an aspect according to the present invention, it is possible to shorten the time required for the repair and inspection processes of the turbine.

DESCRIPTION OF EMBODIMENTS

Hereinafter, an embodiment of a method for mounting or dismounting a component of a turbine, a device for executing the method, and a method for installing the device according to the present invention will be described in detail with reference to the accompanying drawings.

Embodiment

First, an embodiment of a plant to which the method for mounting or dismounting the component of the turbine according to the present invention is applied will be described.

Figure 1:
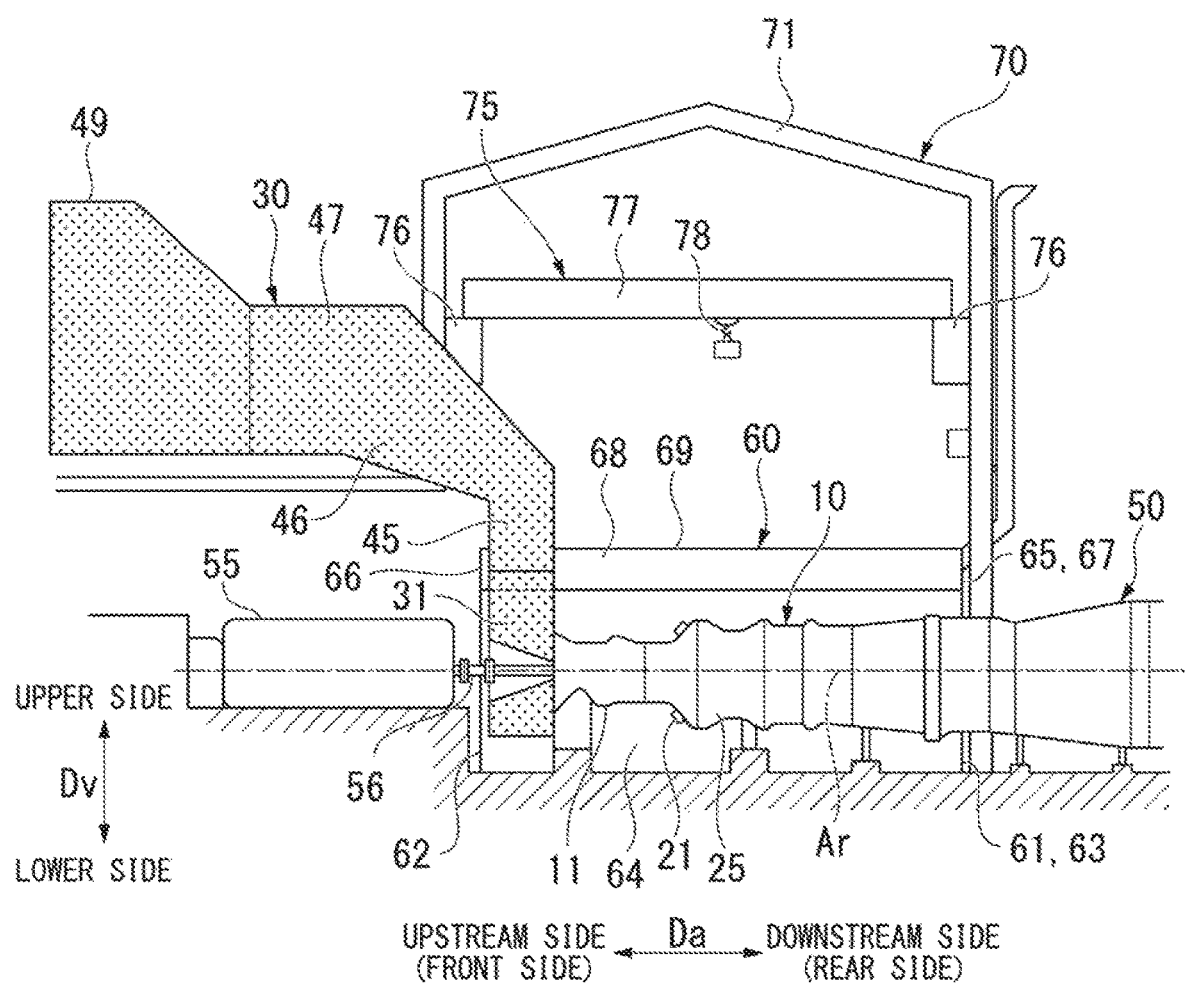
FIG. 1 is a cutaway side view of main parts of a plant in an embodiment according to the present invention.

As illustrated in FIG. 1, a plant of the present embodiment is equipped with a gas turbine 10, a generator 55 that generates electric power by being driven by the gas turbine 10, an intake duct 30 that guides air to the gas turbine 10, an intake filter device 49 that cleans the air flowing into the intake duct 30, an exhaust duct 50 through which the exhaust gas from the gas turbine 10 flows, an enclosure 60 that covers the gas turbine 10, a turbine building 70 that houses the gas turbine 10 and the generator 55, and an overhead crane 75 that is provided in the turbine building 70.

Figure 2:
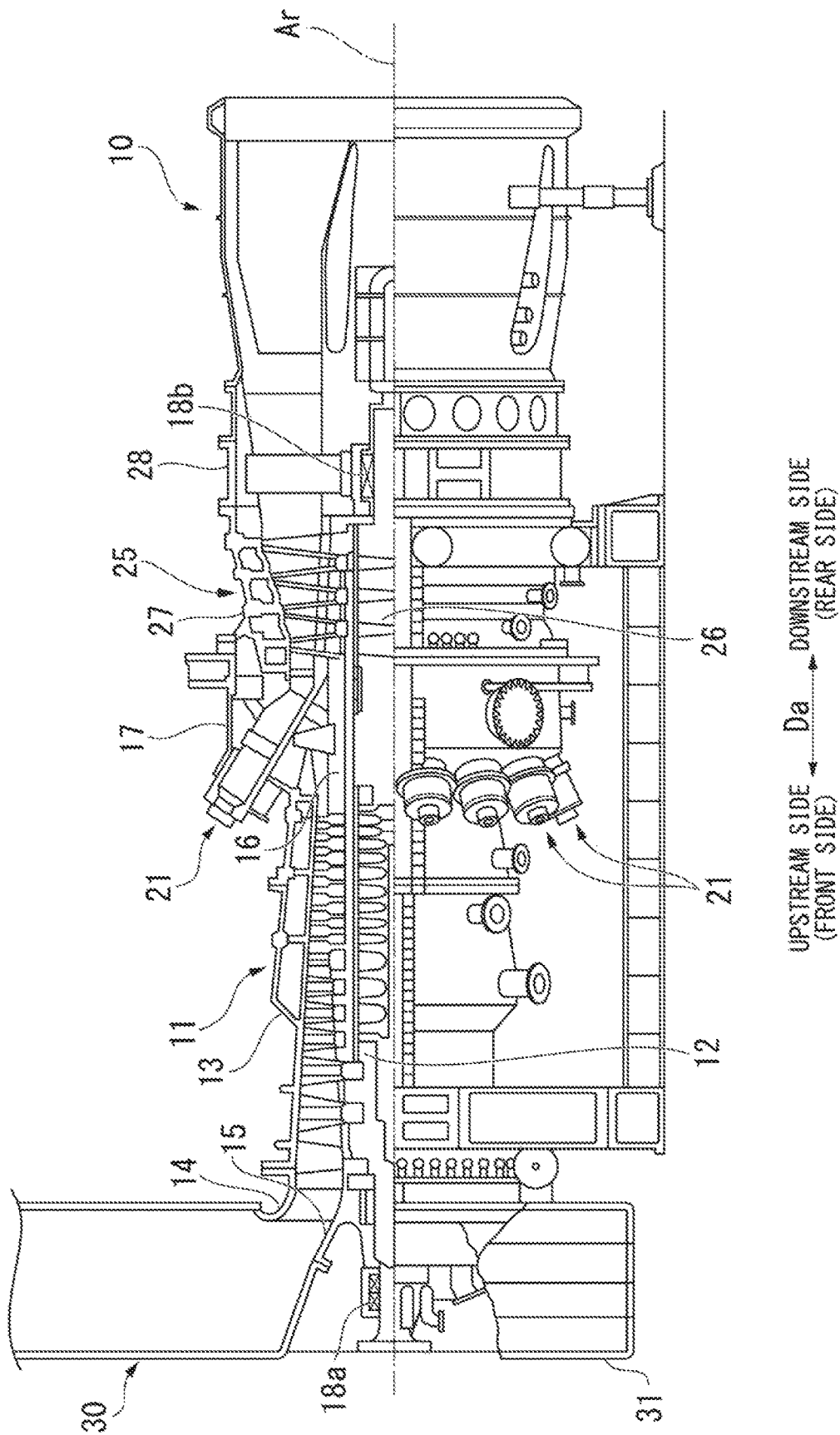
FIG. 2 is a cutaway side view of main parts of a gas turbine in the embodiment according to the present invention.

As illustrated in FIG. 2, the gas turbine 10 is equipped with a compressor 11 that compresses air from the intake duct 30, a combustor 21 that combusts the fuel in the air compressed by the compressor 11 to generate combustion gas, a turbine 25 that is driven by the combustion gas from the combustor 21, and an exhaust casing 28 that guides the exhaust gas from the turbine 25 to the exhaust duct 50.

The compressor 11 has a compressor rotor 12 which rotates about a rotational axis Ar, and a compressor casing 13 which rotatably covers the compressor rotor 12. Hereinafter, a direction in which the rotational axis Ar extends will be referred to as an axial direction Da. The turbine 25 has a turbine rotor 26 that rotates about the rotational axis Ar, and a turbine casing 27 that rotatably covers the turbine rotor 26. The compressor rotor 12 and the turbine rotor 26 are located on the same rotational axis Ar, and are connected to each other to form a gas turbine rotor 16. A generator rotor of the generator 55 is connected to the gas turbine rotor 16.

The compressor casing 13, the turbine casing 27 and the exhaust casing 28 are aligned in the axial direction Da in this order, and are connected to each other to form a gas turbine casing 17. Hereinafter, a side of the compressor casing 13 relative to the turbine casing 27 in the axial direction Da will be referred to as an upstream side or a front side, and a side of the turbine casing 27 relative to the compressor casing 13 in the axial direction Da will be referred to as a downstream side or a rear side. In addition, a horizontal direction perpendicular to the axial direction Da will be referred to as a lateral direction Dh. Furthermore, a direction perpendicular to the axial direction Da and the lateral direction Dh will be referred to as a vertical direction Dv.

The intake duct 30 is disposed in front of the compressor casing 13, and the exhaust duct 50 is disposed behind the exhaust casing 28.

The gas turbine 10 is further equipped with a front bearing 18a that rotatably supports the front side of the gas turbine rotor 16, and a rear bearing 18b that rotatably supports the rear side of the gas turbine rotor 16.

As illustrated in FIG. 1, the intake duct 30 has a compressor connecting portion 31, a duct vertical portion 45, a duct bent portion 46, and a duct horizontal portion 47. The compressor connecting portion 31 is connected to the compressor casing 13. The duct vertical portion 45 extends vertically upward from the compressor connecting portion 31. The duct bent portion 46 is connected to the upper end of the duct vertical portion 45. The duct horizontal portion 47 extends in the axial direction Da, with a rear side thereof in the axial direction Da connected to the duct bent portion 46 and a front side thereof in the axial direction Da connected to the intake filter device 49.

The overhead crane 75 has a pair of traveling rails 76 that face each other in an extending axial direction Da of the lateral direction Dh, a girder 77 which extends in the axial direction Da and of which both ends are supported on the traveling rails 76, and a hoist 78 mounted on the girder 77. The pair of traveling rails 76 are disposed at a position that is higher than the gas turbine 10 and the enclosure 60 and is lower than a roof 71 of the turbine building 70. Of the pair of traveling rails 76, one traveling rail 76 is disposed on the front side of the gas turbine 10 in the axial direction Da, and the other traveling rail 76 is disposed on the rear side of the gas turbine 10 in the axial direction Da. The girder 77 travels on the pair of traveling rails 76 in the lateral direction Dh, in a state in which both ends thereof in the axial direction Da are supported by the pair of traveling rails 76. The hoist 78 is mounted on the girder 77 so as to be movable in the axial direction Da.

The enclosure 60 has an upper enclosure 65 that covers the upper side of the gas turbine 10, and a lower enclosure 61 that covers the side periphery of the gas turbine 10. The lower enclosure 61 has a front wall plate 62 and a rear wall plate 63 that face each other in the axial direction Da, and a pair of side wall plates 64 corresponding to each other in the lateral direction Dh. The gas turbine 10 is disposed between the front wall plate 62 and the rear wall plate 63 in the axial direction Da. An opening through which a connecting shaft 56 that mechanically connects the rotor of the generator 55 and the gas turbine rotor 16 is inserted is formed in the front wall plate 62. An opening through which the exhaust duct 50 is inserted is formed in the rear wall plate 63. The gas turbine 10 is disposed between the pair of side wall plates 64 in the lateral direction Dh. The upper enclosure 65 has a front wall plate 66 provided on the front wall plate 62 of the lower enclosure 61, a rear wall plate 67 provided on the rear wall plate 63 of the lower enclosure 61, a pair of side wall plates 68 provided on the pair of side wall plates 64 of the lower enclosure 61, and a top plate 69. The top plate 69 of the upper enclosure 65 closes the opening of the upper enclosure 65 that is formed by the upper edge of the front wall plate 66 of the upper enclosure 65, the upper edge of the rear wall plate 67 of the upper enclosure 65, and the upper edges of the pair of side wall plates 68 of the upper enclosure 65. An opening through which the intake duct 30 is inserted is formed in the top plate 69.

Figure 3:
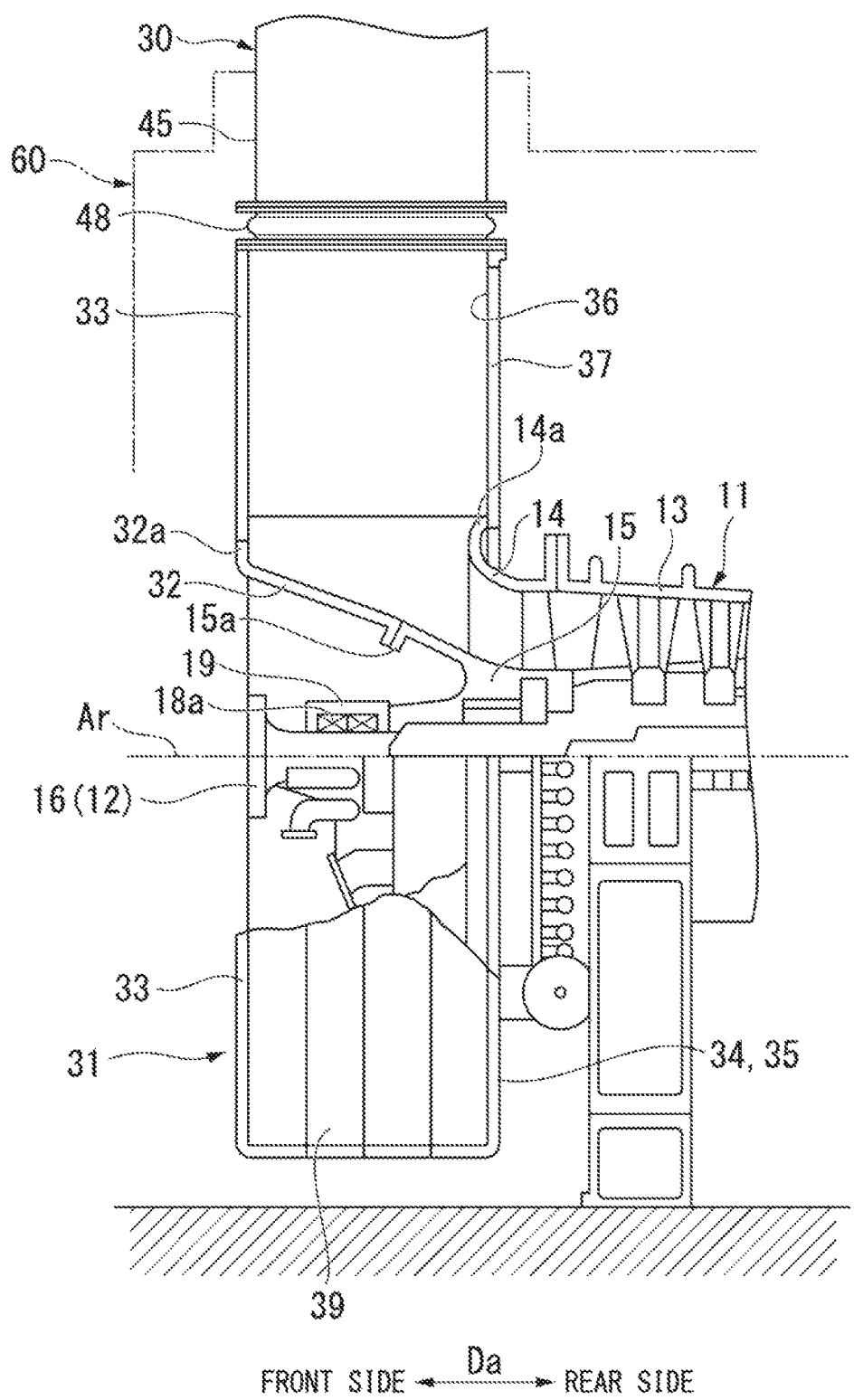
FIG. 3 is a cutaway side view of main parts of an intake duct in the embodiment according to the present invention.

As illustrated in FIG. 3, the compressor casing 13 has an outer casing 14 and an inner casing 15 that each form a cylindrical shape around the rotational axis Ar. The inner casing 15 covers the outer periphery of the front side in the axial direction Da of the compressor rotor 12. The outer casing 14 covers substantially the entire outer periphery of the compressor rotor 12. Between the radially inner side of the cylindrical outer casing 14 and the radially outer side of the cylindrical inner casing 15, an annular air flow path about the rotational axis Ar is formed.

Figure 4:
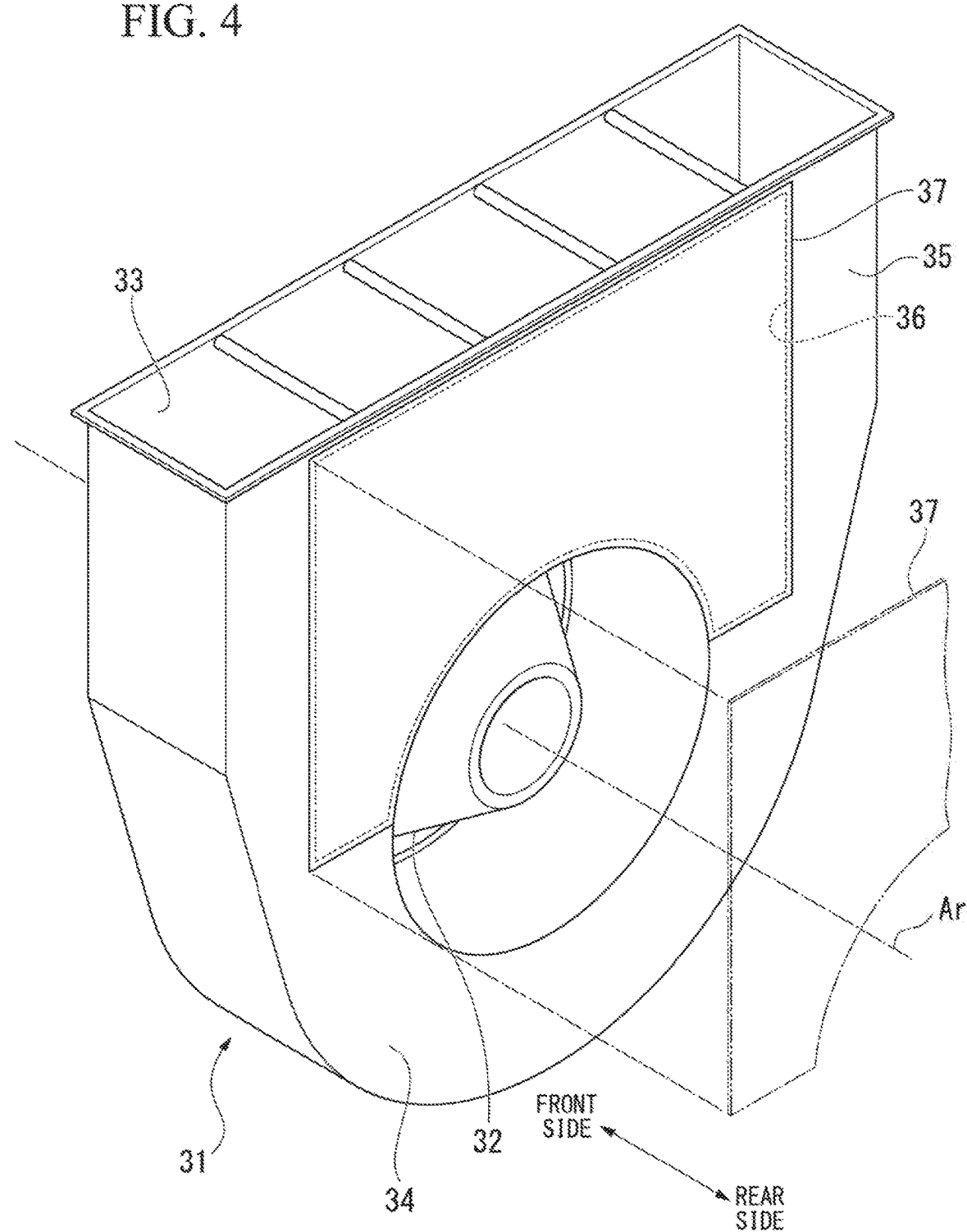
FIG. 4 is a perspective view of the intake duct in the embodiment according to the present invention.

As illustrated in FIGS. 3 and 4, the compressor connecting portion 31 of the intake duct 30 has a connection cylinder 32 that forms a cylindrical shape around the rotational axis Ar and is mounted on a front end 15a of the inner casing 15, a front plate 33 and a rear plate 34 that spread in a direction perpendicular to the rotational axis Ar and face each other at an interval in the axial direction Da, and a side plate 39 that connects the radially outer edge of the front plate 33 and the radially outer edge of the rear plate 34.

The rear plate 34 is fixed to a front outer peripheral edge 14a of the outer casing 14. The front plate 33 is fixed to a front end 32a of the connection cylinder 32. As described above, the side plate 39 is located between the radially outer edge of the front plate 33 and the radially outer edge of the rear plate 34 to connect fee front and rear plates to each other. However, the side plate 39 does not connect the upper edge which is a part of the radially outer edge of the front plate 33 with the tipper edge which is a part of the radially outer edge of the rear plate 34. In other words, the upper edge of the front plate 33 and the upper edge of the rear plate 34 are not connected to each other by the side plate 39. Therefore, the opening of the compressor connecting portion 31 is formed by the upper edge of the side plate 39, the upper edge of the front plate 33, and the upper edge of the rear plate 34. The rear plate 34 has a rear plate body 35 in which an opening (hereinafter referred to as a rear plate opening 36) penetrating in the axial direction Da is formed, and a lid 37 that closes the rear plate opening 36. The rear plate opening 36 is formed below the upper edge of the rear plate body 35 and above the rotational axis Ar of the gas turbine 10. The front bearing 18a of the gas turbine 10 is disposed on the inner peripheral side of the connection cylinder 32.

The duct vertical portion 45 is connected to the upper edge of the compressor connecting portion 31 via an expansion 48. The expansion 48 is provided to suppress vibration or the like of the compressor connecting portion 31 from being transmitted to the duct vertical portion 45.

Next, the hanging device for executing the method for mounting or dismounting the component of the gas turbine 10 will be described.

Figure 5:
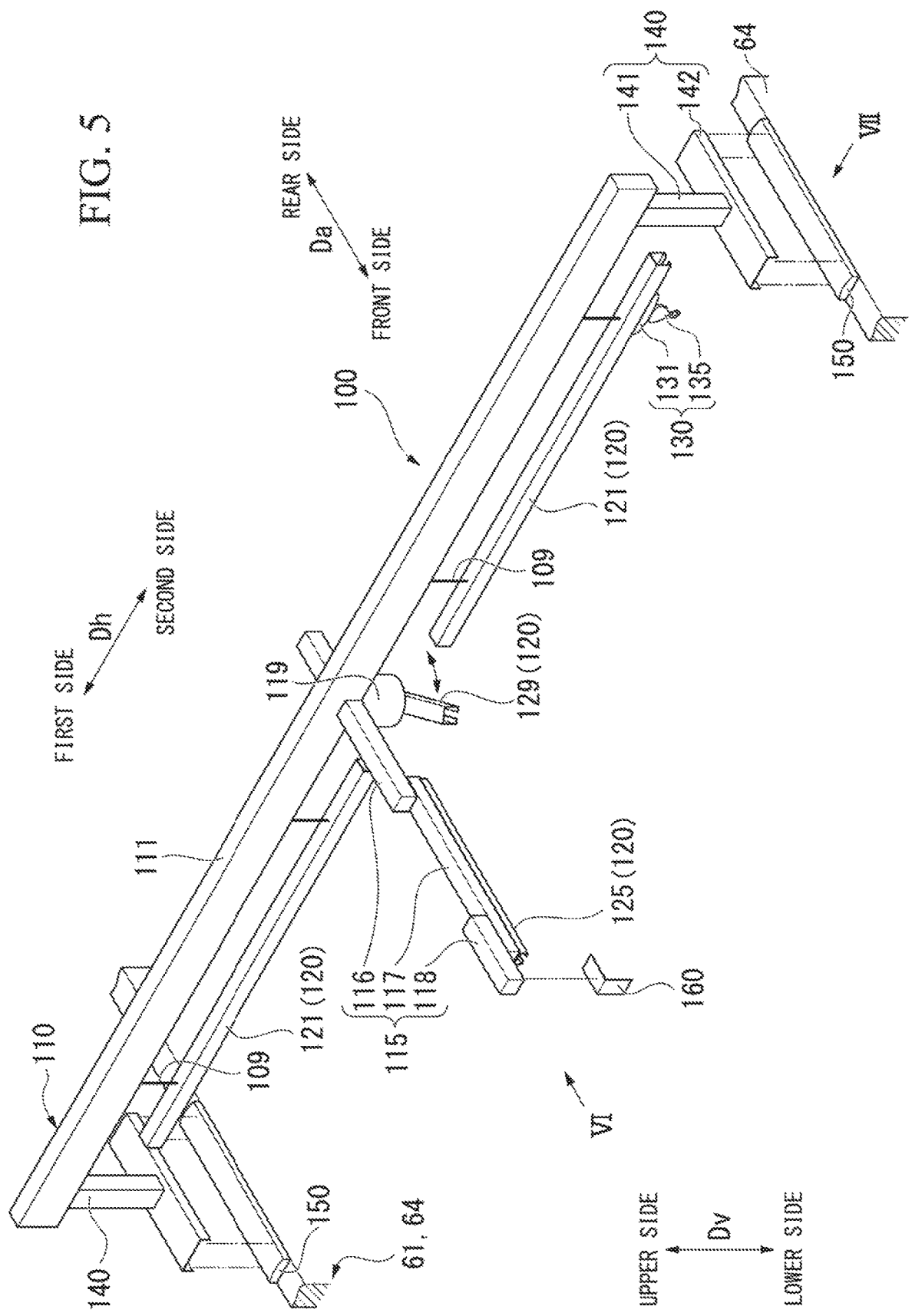
FIG. 5 is a perspective view of a hanging device in the embodiment according to the present invention.
Figure 6:
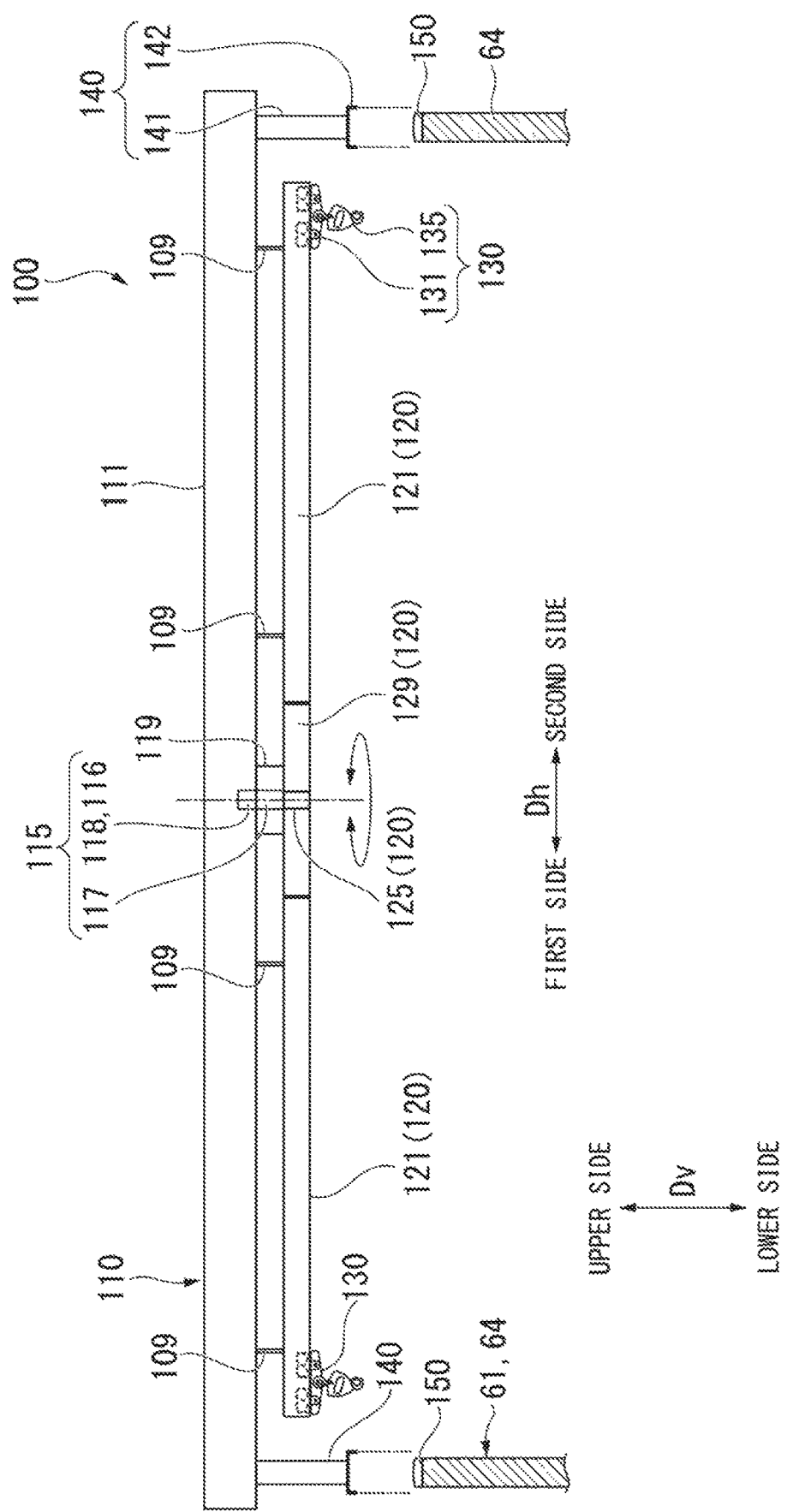
FIG. 6 is a view taken from an arrow VI in FIG. 5.
Figure 7:
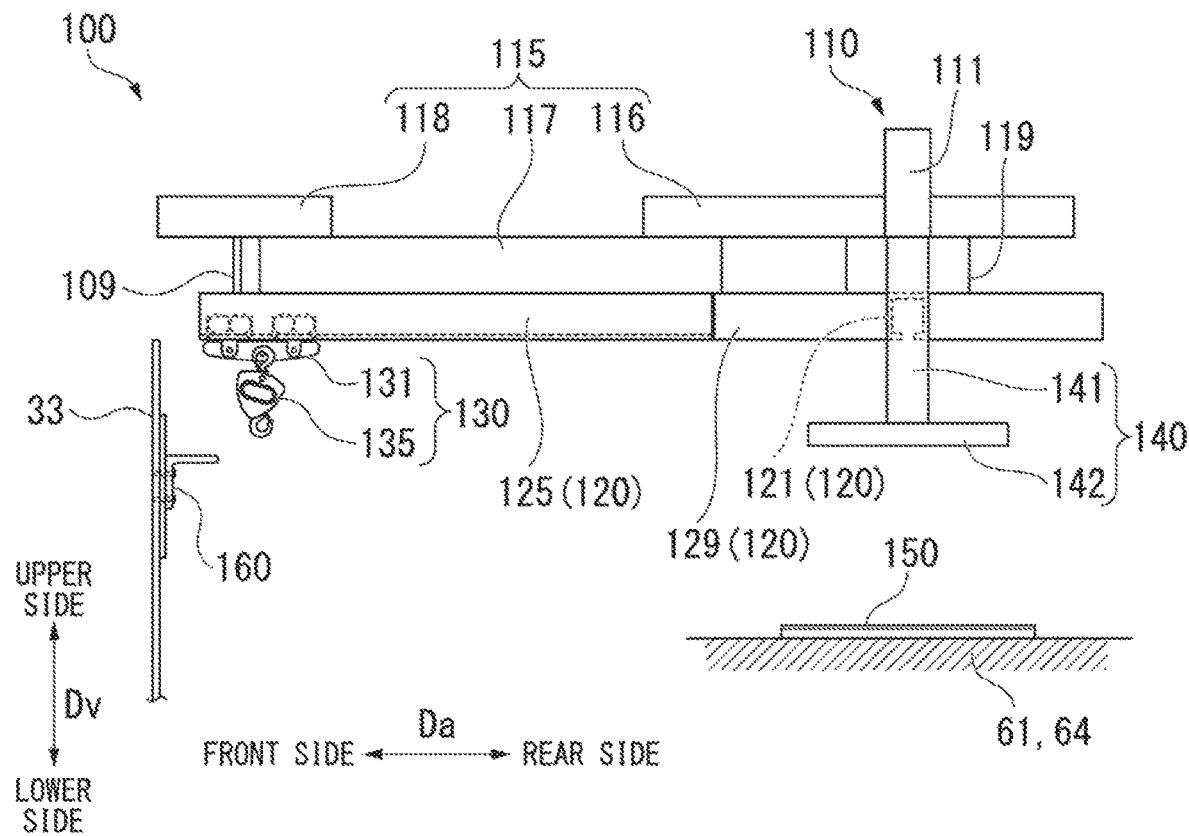
FIG. 7 is a view taken from an arrow VII in FIG. 5.

As illustrated in FIGS. 5 to 7, the hanging device 100 is equipped with a bridge member 110 having a traveling path 120, a hanging tool 130 that travels along the traveling path 120 with the component of the gas turbine 10 hung thereon, a leg member 140 that supports the bridge member 110, a pedestal 150 disposed between the leg member 140 and the side wall plate 64 of the lower enclosure 61, and an axial beam support seat 160 that supports an end of the bridge member 110.

The bridge member 110 has a lateral beam member 111 that extends in the lateral direction Dh and bridges the upper ends of the pair of side wall plates 64, an axial beam member 115 extending in the axial direction Da, a lateral path 121 that extends in the lateral direction Dh and is mounted on the lateral beam member 111, an axial path 125 that extends in the axial direction Da and is mounted on the axial beam member 115, a connecting path 129 that connects the lateral path 121 and the axial path 125 such that the hanging tool 130 is movable between the lateral path 121 and the axial path 125, and a connecting path rotation support portion 119 that rotatably supports the connecting path 129. Further, the traveling path 120 has the lateral path 121, the connecting path 129, and the axial path 125.

The lateral beast member 111, for example, is formed of rectangular steel. The length in the lateral direction Dh of the lateral beam member 111 is slightly longer than the interval between the pair of side wall plates 64. The axial beam member 115 has a first axial beam member 116, a second axial beam member 117, and a third axial beam member 118. The first axial beam, member 116, a second axial beam member 117, and the third axial beam member 118, for example, are formed of rectangular steel. The first axial beam member 116, the second axial beam member 117 and the third axial beam member 118 extend in the axial direction Da, are aligned from the rear side to the front side on a straight line in that order, and are joined together. The first axial beam member 116 is joined to the intermediate portion in the lateral direction Dh of the lateral beam member 111 such that its lower surface is flush with the lower surface of the lateral beam member 111. The second axial beam member 117 is joined to the lower surface of the front end side of the first axial beam member 116. The third axial beam member 118 is joined to the upper surface of the front end side of the second axial beam member 117. Therefore, the first axial beam member 116, the second axial beam member 117, and the third axial beam member 118 are aligned on the straight line in the axial direction Da when viewed from the vertical direction, but when viewed Mm the lateral direction Dh, the intermediate second axial beam member 117 is shifted to the lower side with respect to the first axial beam member 116 and the third axial beam member 118.

The lateral path 121 is hung down from the lateral beam member 111 by a tension suspension 109 or the like, on the lower side of the lateral beam member 111. The lateral path 121 is disposed below the lateral beam member 111 along substantially the entire lateral beam member 111 in the lateral direction Dh, but is not disposed in the central portion in the lateral direction Dh or at either end in the lateral direction Dh of the lateral beam member 111.

The axial path 125 is hung down from the second axial beam member 117 and the third axial beam member 118 by the tension suspension 109 or the like so as to be located on the same virtual plane as the lateral path 121, on the lower side of the second axial beam member 117 and the third axial beam member 118.

The connecting path 129 is located on the same virtual plane as the lateral path 121 and the axial path 125, and is supported by the connecting path rotation support portion 119 so as to be rotatable on the axis perpendicular to the virtual plane around an intersection point between the extension line of the lateral path 121 and the extension line of the axial path 125. The connecting path rotation support portion 119 is mounted on the central portion of the lateral beam member 111 in which the lateral path 121 is not provided in the lateral beam member 111, and on the first axial beam member 116 in which the axial path 125 is not provided in the axial beam member 115.

Figure 8:
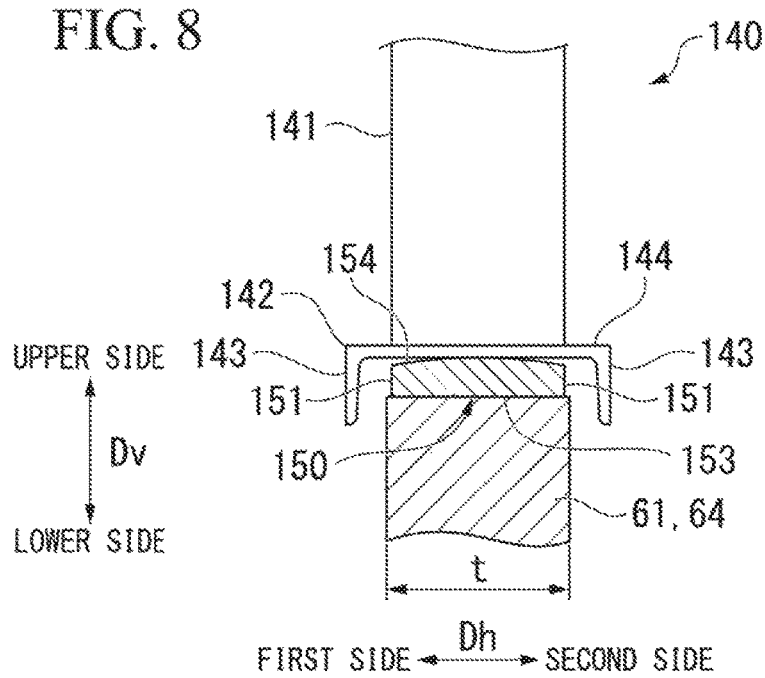
FIG. 8 is a front view of a leg member in fee embodiment according to the present invention.

The leg member 140 is a member for setting an installation height of the traveling path 120 to a desired height. As illustrated in FIG. 8, the leg member 140 has a leg 141 extending in the vertical direction Dv, and a leg seat 142 joined to the lower end of the leg 141. The leg seat 142 is formed of channel steel. Therefore, the leg seat 142 has a pair of flanges (flange portions) 143 that are parallel to each other and face each other, and a web portion 144 that connects the pair of flanges 143. The leg seat 142 is disposed so that the pair of flanges 143 face each other in the lateral direction Dh and the web portion 144 is disposed on the upper side of the pair of flanges 143. The dimension of the interval between the pair of flanges 143 is greater than a dimension in the lateral direction Dh of the side wall plate 64, i.e., a thickness dimension t of the side wall plate 64. Therefore, when the leg seat 142 is disposed on the side wall plate 64, the side wall plate 64 is interposed between the pair of flanges 143 of the leg seat 142. The leg 141 is joined to the upper surface of the web portion 144. The end in the lateral direction Dh of the lateral beam member 111 is joined to the upper end of the leg 141.

As illustrated in FIG. 8, the pedestal 150 disposed between the leg member 140 and the side wall plate 64 of the lower enclosure 61 forms a substantially rectangular parallelepiped shape, and has a pair of side surfaces 151 facing each other in the lateral direction Dh, a pair of end surfaces facing each other in the axial direction Da, a lower surface 153, and an upper surface 154. However, the upper surface 154 is a circumferential surface that protrudes upward rather than a flat surface. Therefore, a central portion in the lateral direction Dh of the pedestal 150 gently protrudes upward. Further, the boundary between the upper surface 154 and each side surface 151 is chamfered, and has a smooth curved surface.

Figure 9:
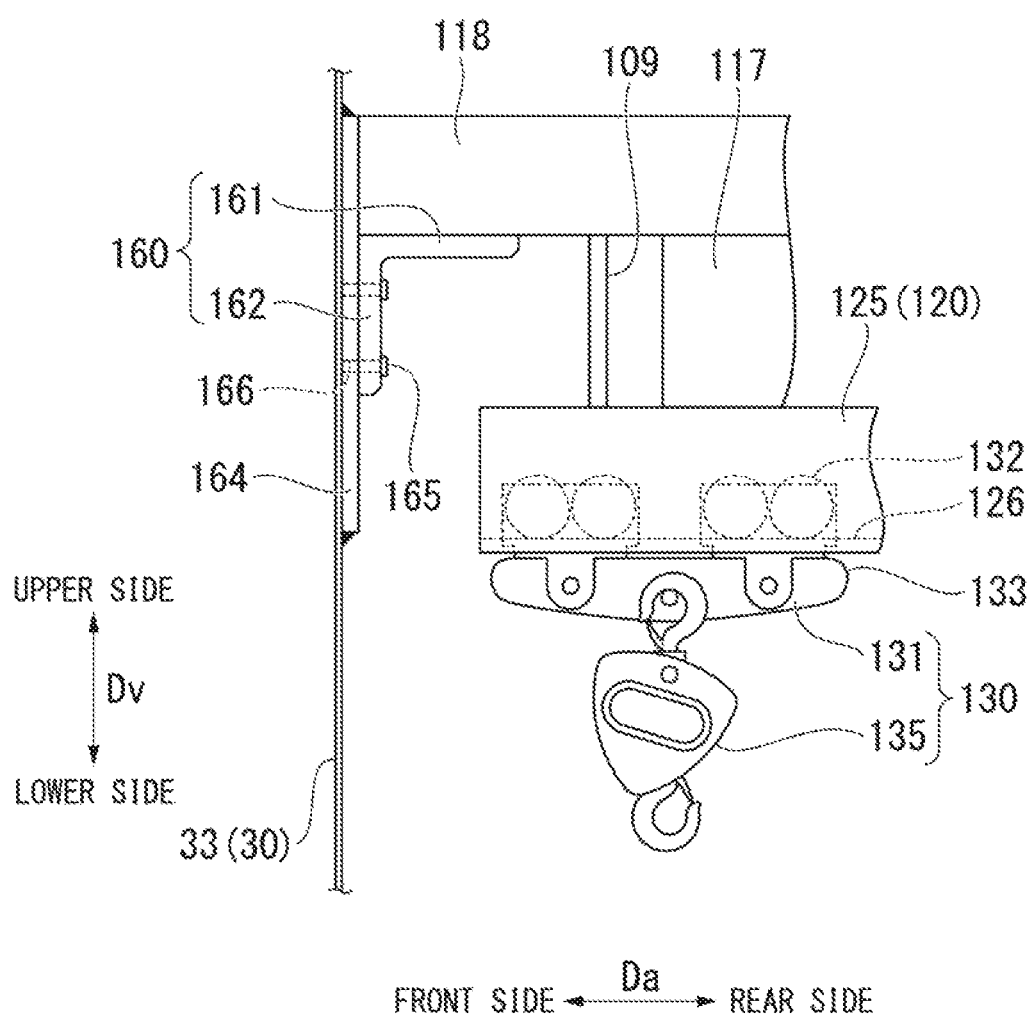
FIG. 9 is a side view of a hanging tool in the embodiment according to the present invention.

As illustrated in FIG. 9, the hanging tool 130 has a trolley 131 that moves along the traveling path 120, and a chain block 135 mounted on the trolley 131. The trolley 131 has a plurality of rollers 132, and a frame 133 that rotatably supports the rollers 132. The traveling path 120 is formed of a steel material of which a cross-section perpendicular to its longitudinal direction has a shape like that of lip channel steel. When the traveling path 120, for example, is formed of the lip channel steel, the opening of the lip channel steel and a lip 126 are directed downward. The rollers 132 of the trolley 131, for example, roll on the upper surface of the lip 126.

As illustrated in FIG. 9, the axial, beam support seat 160 supports the front end of the third axial beam member 118. The axial beam support seat 160 has a receiving plate 161 that receives the front end of the third axial beam member 118, and a fixing plate 162 to be fixed to a reinforcing plate 164 that is welded to the inner surface of the intake duct 30 in advance.

Next, a method for dismounting the component of the gas turbine 10 will be described in accordance with the flowchart illustrated in FIG. 19.

Figure 10:
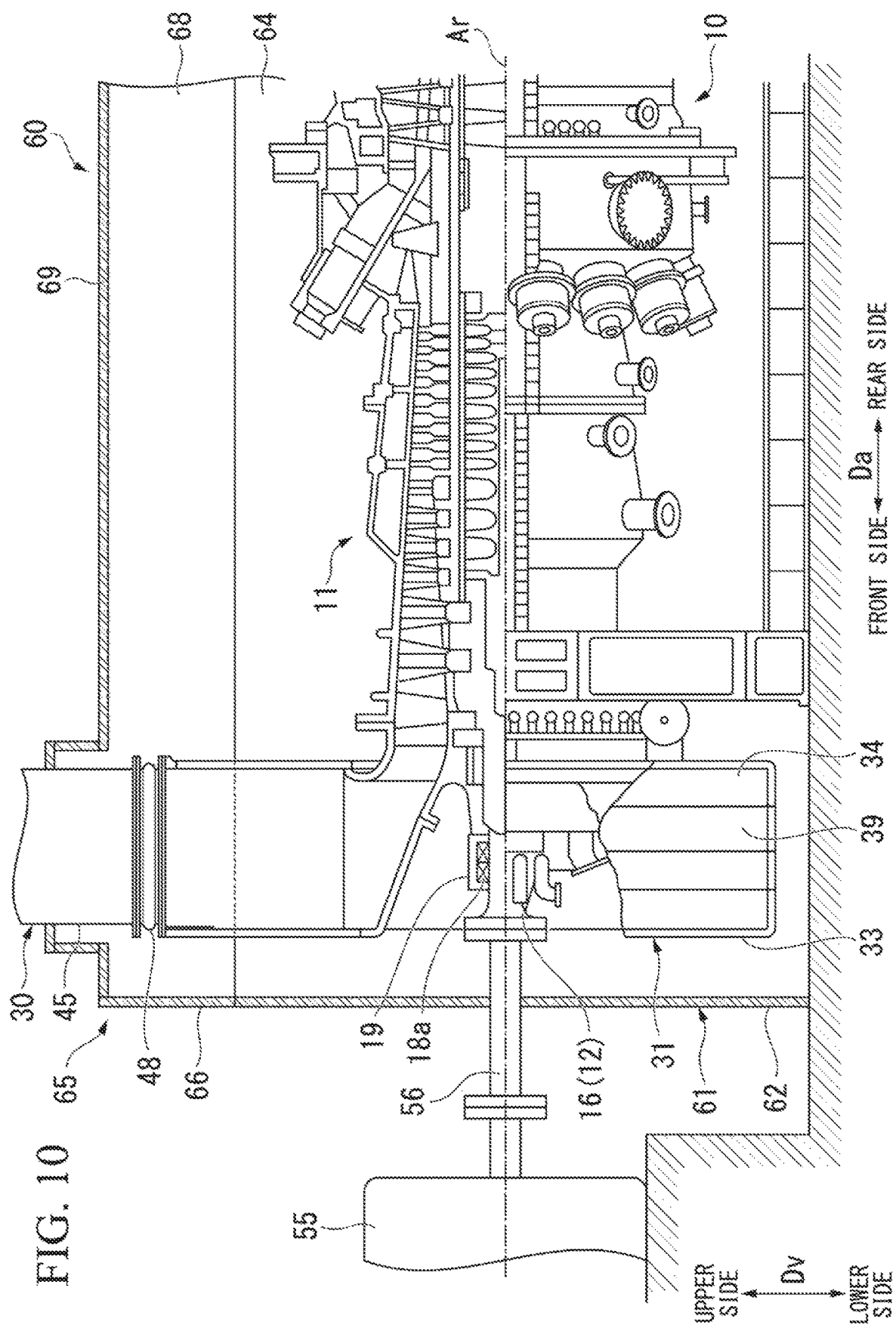
FIG. 10 is an explanatory view representing a state of a plant before dismounting of a component in the embodiment according to the present invention.
Figure 11:
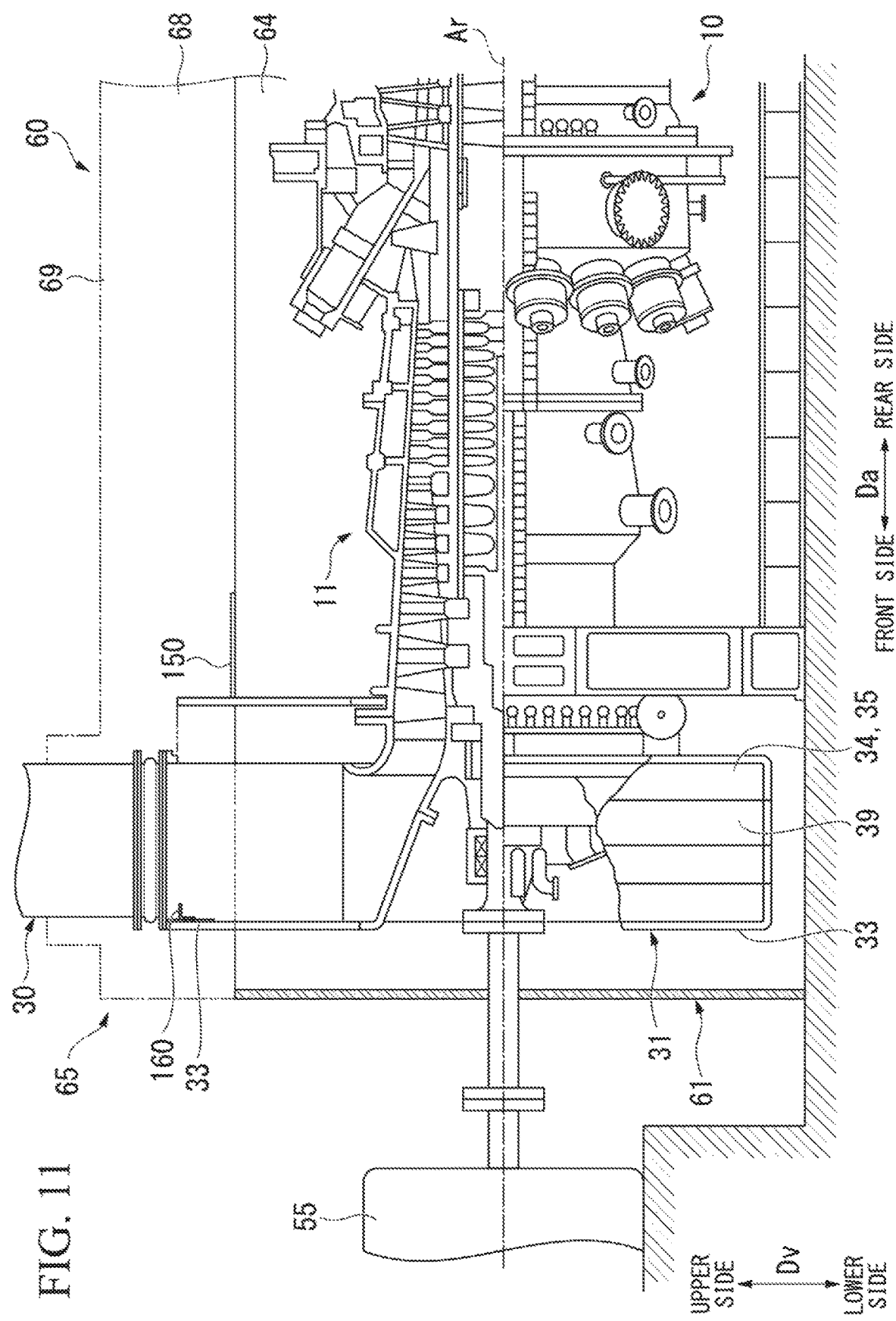
FIG. 11 is an explanatory view representing a state of the plant after an enclosure disassembling process, an opening process, and a seat arranging process in the embodiment according to the present invention.

First, as illustrated in FIGS. 10 and 11, the upper enclosure 65 is dismounted from the lower enclosure 61 using the overhead crane 75 or the like (S1: an enclosure disassembling process).

Next, the bridge member 110 of the hanging device 100 is disposed on the lower enclosure 61 (S2: a bridge member arranging process). In the bridge member arranging process (S2), an opening process (S3), a seat arranging process (S4), an inserting process (S5), an end supporting process (S6), and a lateral beam member arranging process (S7) are executed.

In the bridge member arranging process (S2), first, as illustrated in FIG. 11, the lid 37 is detached from the rear plate body 35 of the intake duct 30, and the rear plate opening 36 (see FIG. 4) is opened (S3: the opening process). Next, the fixing plate 162 of the axial beam support seat 160 is fixed to the reinforcing plate 164 (see FIG. 9) that is previously welded to the inner surface of the intake duct 30 that is the surface of the front plate 33 using screws or the like. Furthermore, the pedestal 150 is disposed on each of the upper end surfaces of the pair of side wall plates 64 of the lower enclosure 61 (S4: the seat arranging process).

As illustrated in FIG. 9, when the fixing plate 162 is fixed to the reinforcing plate 164 previously welded to the front plate 33 by screws 165, it is necessary to form screw holes in the reinforcing plate 164. However, such screw holes become resistance to the air flow at the time of operation of the gas turbine 10, which is not preferable. Therefore, screw holes 166 (see FIG. 9) are formed in the reinforcing plate 164, and blind screws are screwed into the screw holes 166 at the time of operation of the gas turbine 10.

Next, as illustrated in FIGS. 12 to 15, the hanging device 100 is hung up by the overhead crane 75 using a wire or the like, and the axial beam member 115 and the axial path 125 of the hanging device 100 are inserted into the intake duct 30 from the rear plate opening 36 of the intake duct 30 (S5: the inserting process).

Figure 12:
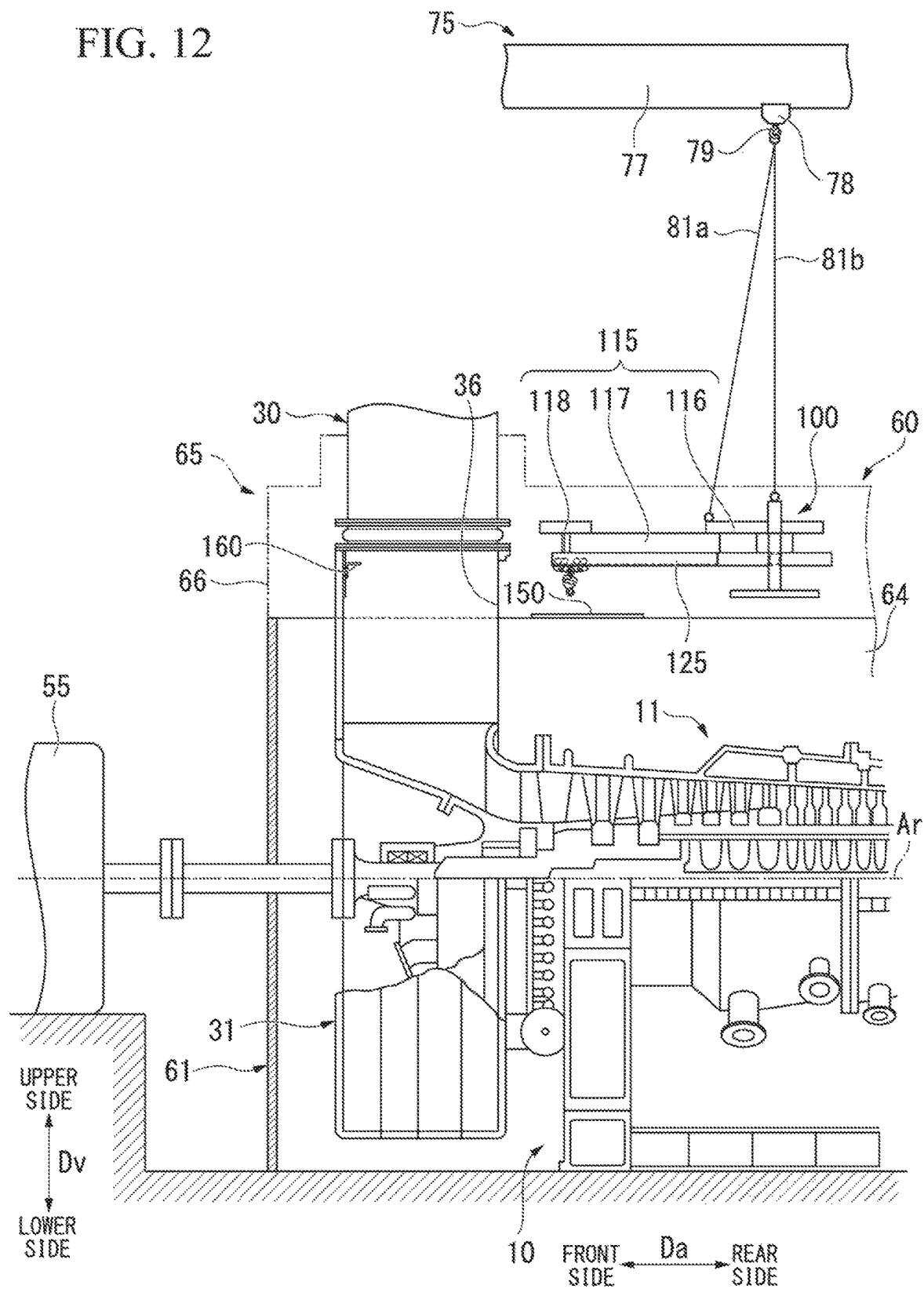
FIG. 12 is an explanatory view (part 1) representing a state of the plant in an inserting process in the embodiment according to the present invention.

In the inserting process (S5), first, as illustrated in FIG. 12, wires 81a and 81b are hooked at a plurality of positions of the hanging device 100, and the wires 81a and 81b are hooked to a hook 79 of the crane 75. Subsequently, by manipulating the hoist 78, the wire of the hoist 78 with the hook 79 mounted oil the lower end is wound up, and the hanging device 100 is hung up. At this time, the axial beam member 115 of the hanging device 100 is substantially parallel to the rotational axis Ar of the gas turbine 10, and the third axial beam member 118 is located on the front side of the first axial beam member 116. Next, by moving the girder 77 of the overhead crane 75 along the traveling rails 76 (see FIG. 1), and if necessary, by moving the hoist 78 along the girder 77, the hanging device 100 is disposed such that the axial beam member 115 and the axial path 125 are located above the rotational axis Ar of the gas turbine 10, on the rear side of the intake duct 30 of the gas turbine 10.

Figure 13:
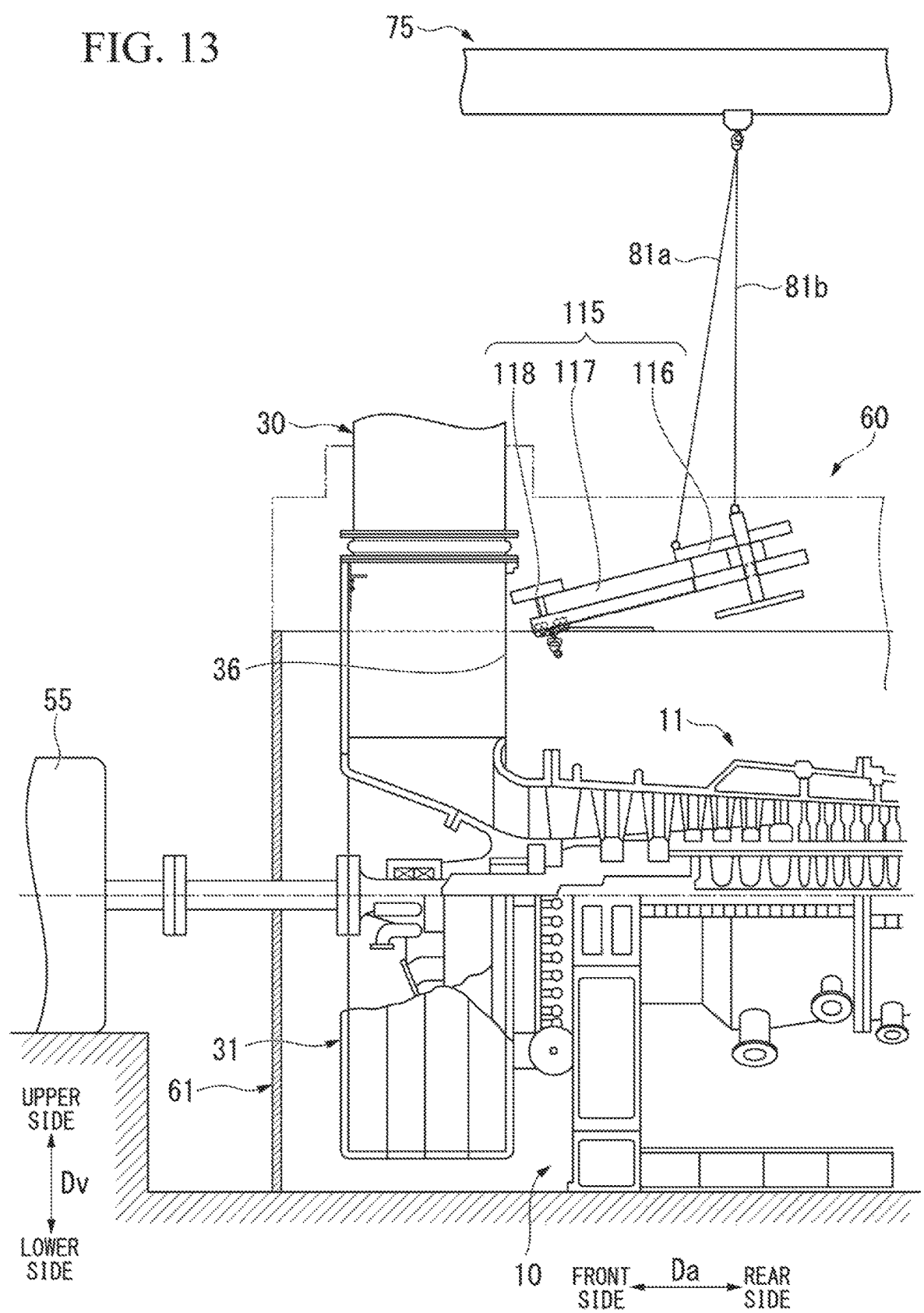
FIG. 13 is an explanatory view (part 2) representing a state of the plant in the inserting process in the embodiment according to the present invention.

In the inserting process (S5), next, as illustrated in FIG. 13, by tilting the hanging device 100 so that the front end of the hanging device 100 is located below the rear end thereof, the upper edges of the second axial beam member 117 and the third axial beam member 118 are located below the upper edge of the rear plate opening 36. At this time, of the plurality of wires 81a and 81b hooked to the hanging device 100, the wire 81a hooked to the front side of the hanging device 100 is extended, and the wire 81b hooked to the rear side of the hanging device 100 is shortened.

Figure 14:
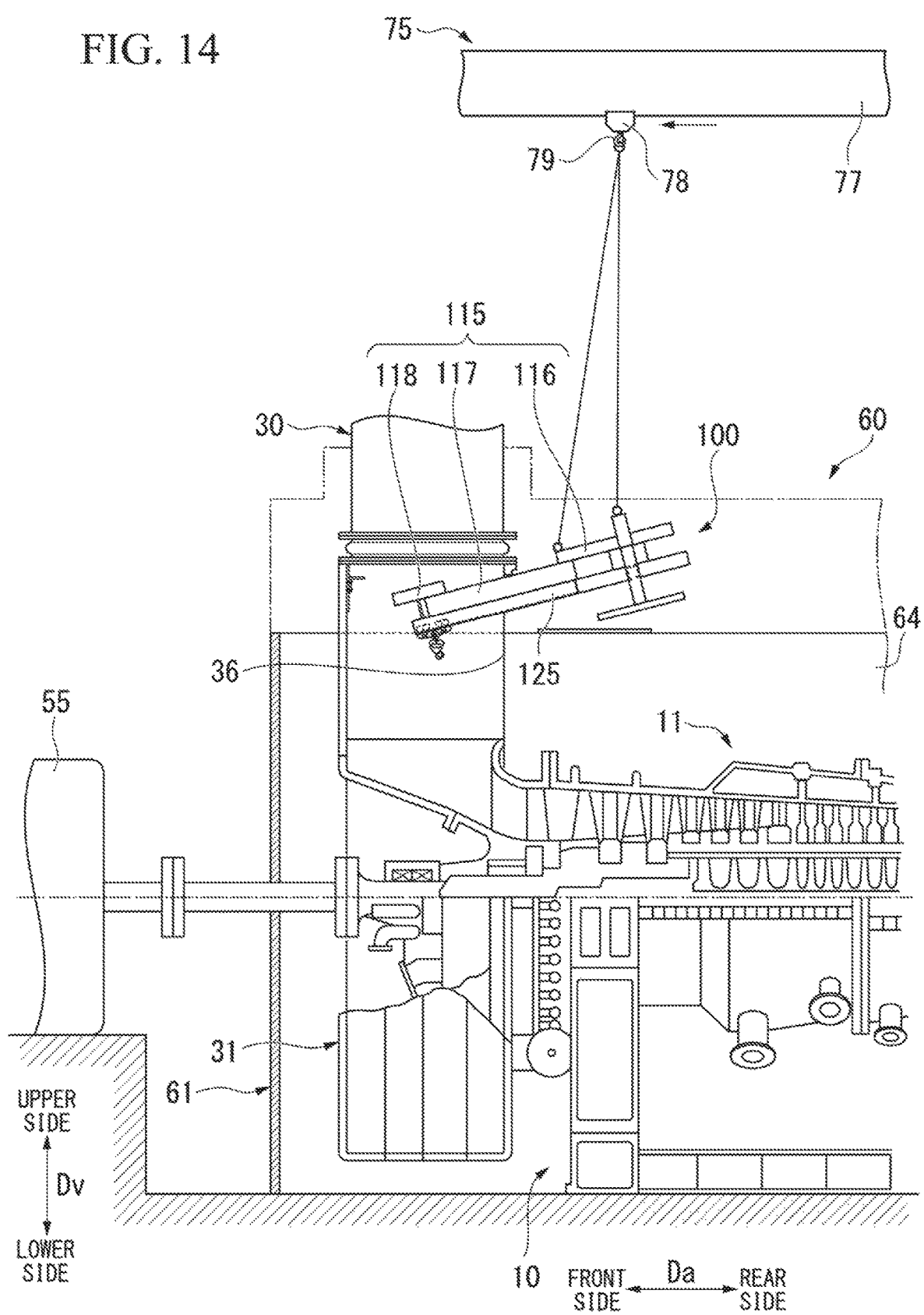
FIG. 14 is an explanatory view (part 3) representing a state of the plant in the inserting process in the embodiment according to the present invention.
Figure 15:
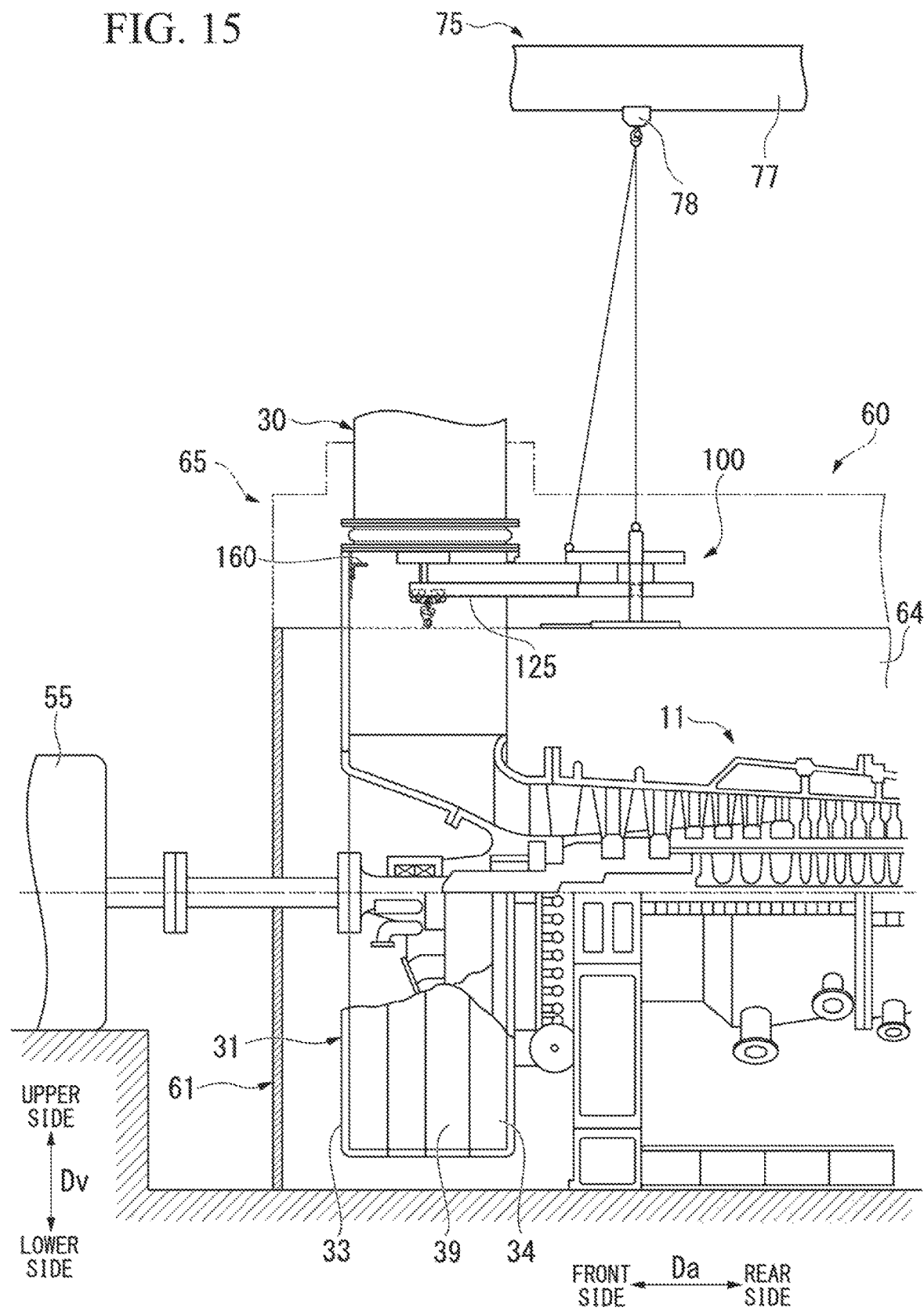
FIG. 15 is an explanatory view (part 4) representing a state of the plant in the inserting process in the embodiment according to the present invention.

In the inserting process (S5), next, as illustrated in FIG. 14, the hoist 78 of the overhead crane 75 is moved to the front side in the axial direction Da along the girder 77, and the second axial beam member 117 and the third axial beam member 118 of the tilted hanging device 100, and a part of the axial path 125 are inserted into the intake duct 30 from the rear plate opening 36. Then, as illustrated in FIG. 15, the hanging device 100 is returned to an untilted state so that the axial path 125 becomes horizontal. Thus, the inserting process (S5) is completed.

Figure 16:
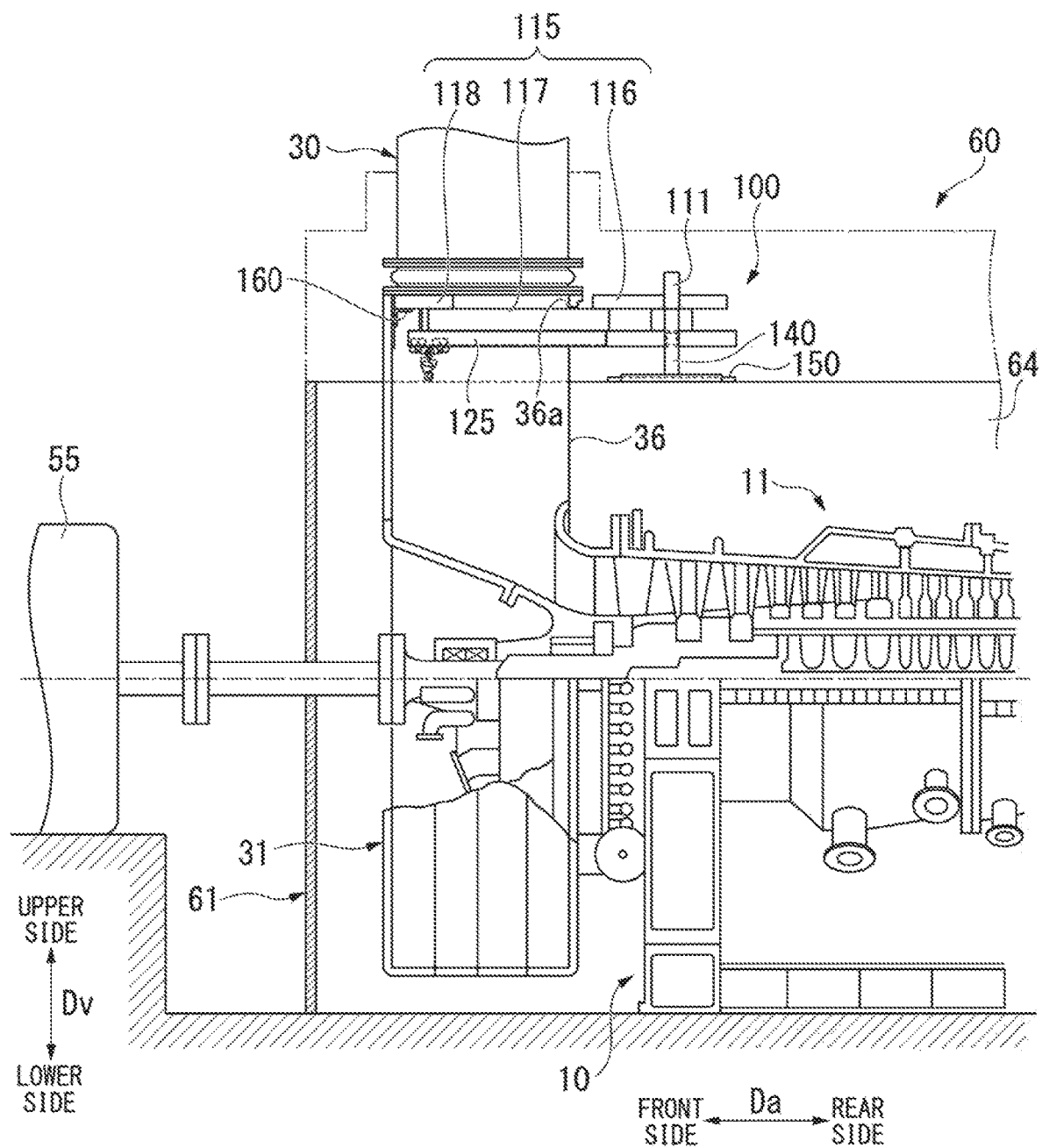
FIG. 16 is an explanatory view representing a state of the plant after an end supporting process and a lateral beam member arranging process in the embodiment according to the present invention.

When the inserting process (S5) is completed, as illustrated in FIGS. 15 and 16, the hoist 78 of the overhead crane 75 is further moved to the front side in the axial direction Da along the girder 77, and the front end of the third axial beam member 118 of the hanging device 100 is placed on the receiving plate 161 of the axial beam support seat 160 (see FIG. 9) (S6: the end supporting process). Subsequently, as illustrated in FIGS. 5 and 16, the ends of the lateral beam member 111 of the hanging device 100 are placed on the side wall plates 64 of the lower enclosure 61 via the leg members 140 and the pedestals 150 of the hanging device 100. That is, the lateral beam member 111 bridges the upper ends of the pair of side wall plates 64 (S7: the lateral beam member arranging process and a height adjusting process). Thus, the installation of the hanging device 100 is completed.

In the hanging device 100 having a T-shape when viewed from the top, when the installation is completed, the front end of the axial beam member 115 corresponding to the lower end of the T-shape is supported by the axial beam support seat 160, and both ends of the lateral beam member 111 corresponding to both ends of both arms of the T-shape are supported by the side wall plates 64 of the lower enclosure 61 via the leg members 140 and the pedestals 150. Therefore, the hanging device 100 is stably supported in the installed state.

In the installed state of the hanging device 100, the leg member 140 is placed on the pedestal 150 that is placed on the upper end surface of the side wall plate 64 of the lower enclosure 61. As described above using FIG. 8, because the central portion in the lateral direction Dh of the pedestal 150 gently protrudes upward, even if the leg 141 of the leg member 140 is slightly tilted, it is possible to mitigate the stress concentration on the joint portion between the leg 141 and the leg seat 142, the corner of the upper end of the side wall plate 64, or the like.

Further, in the installed state of the hanging device 100, because the flanges (flange portions) 143 of the leg seats 142 are located on both sides in the lateral direction Dh of the side wall plates 64, even if a slight load in the lateral direction Dh is applied to the leg member 140 or the bridge member 110 joined to the leg member 140, it is possible to prevent the leg member 140 from deviating in the lateral direction Dh from the upper surface of the side wall plate 64. In the present embodiment, although a pair of flanges 143 are provided in each of the two leg members 140, the flange 143 may be provided only on the first side in the lateral direction Dh of one leg member 140 of the two leg members 140, and the flange 143 may be provided only on the second side in the lateral direction Dh of the other leg member 140.

Further, in the installed state of the hanging device 100, the second axial beam member 117 is located below the upper edge 36a of the rear plate opening 36, the upper surface of the second axial beam member is lower than the upper edge 36a of the rear plate opening 36, and meanwhile, the upper surface of the first axial beam member 116 and the upper surface of the third axial beam member 118 are higher than the upper edge 36a of the rear plate opening 36.

Figure 17:
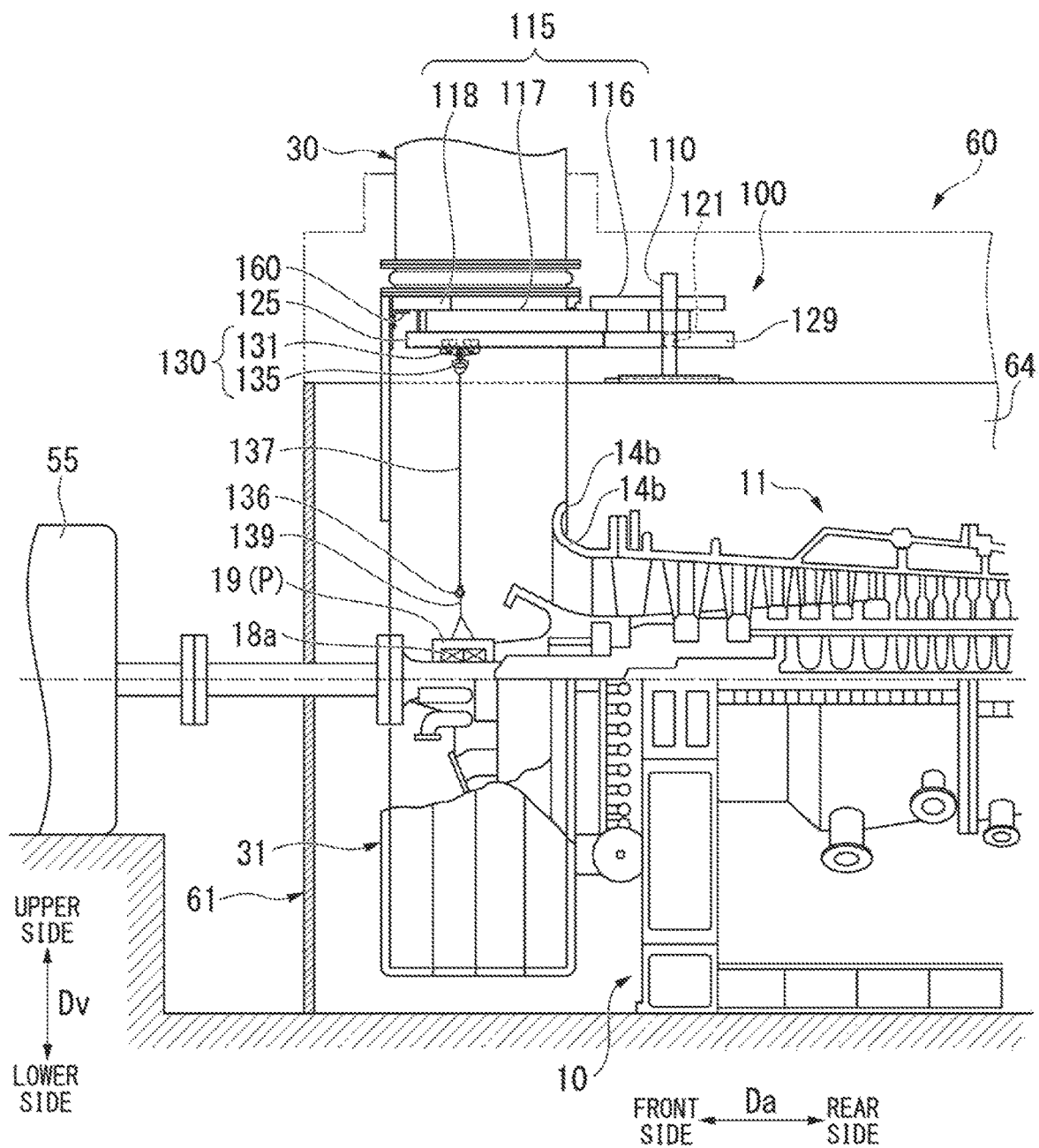
FIG. 17 is an explanatory view (part 1) representing a state of the plant in a component moving process in the embodiment according to the present invention.
Figure 18:
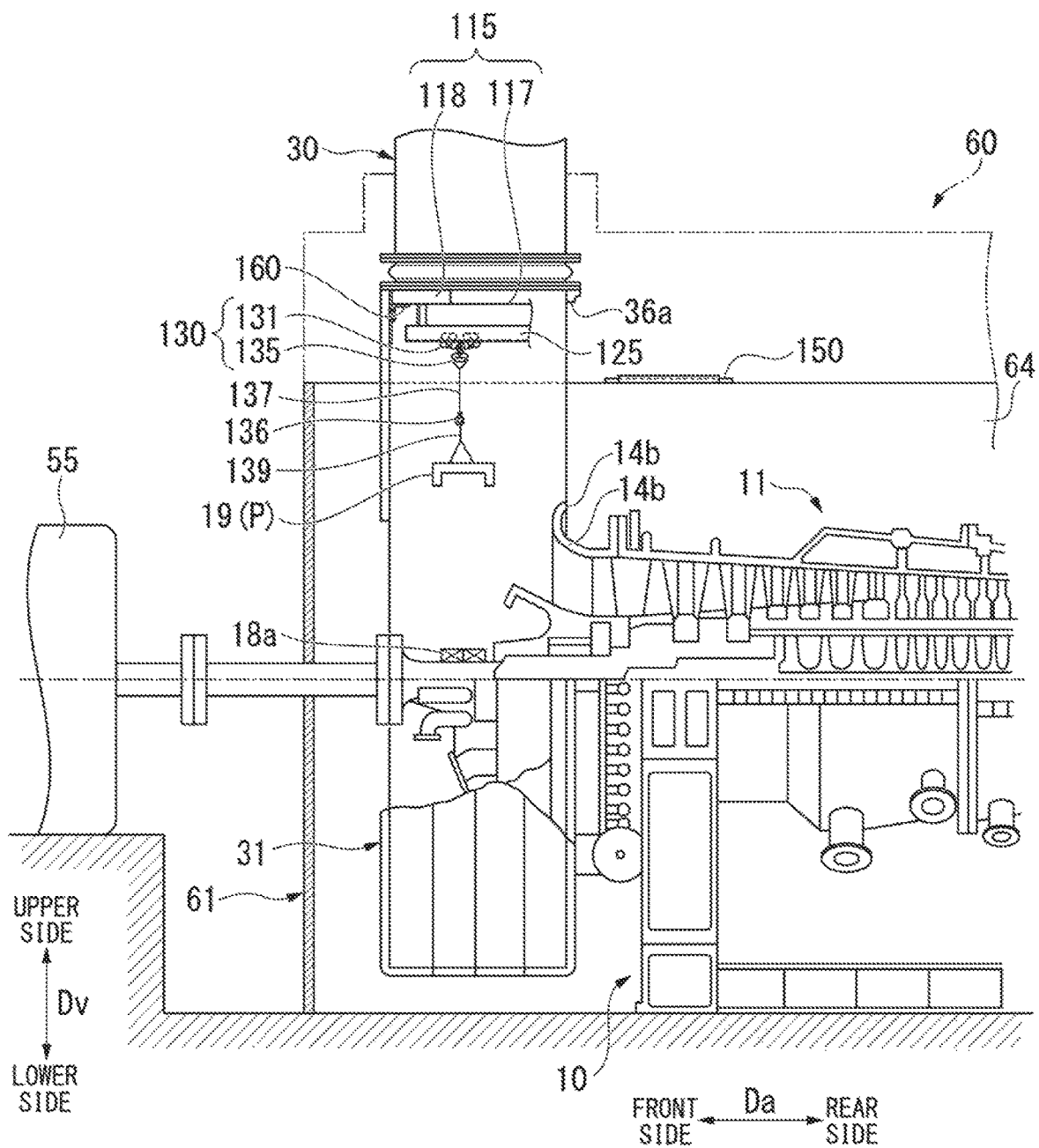
FIG. 18 is an explanatory view (part 2) representing a state of the plant in the component moving process in the embodiment according to the present invention.

When installation of the hanging device 100 is completed, as illustrated in FIGS. 17 and 18, by hanging up a component P of the gas turbine 10 using the hanging tool 130 of the hanging device 100, the component P is moved (S8: a component moving process). In the component moving process (S8), the component P or the tike of the gas turbine 10 serving as a movement target is disassembled. After being disassembled, the component P is hung down from the hook 136 of the chain block 135 via a wire 139 or the like. Further, by winding up the chain 137 of the chain block 135, the component P is raised so that the lower end of the component P is located over the lower edge of the rear plate opening 36 and the upper edge 14b of the outer casing 14 of the compressor 11. Thereafter, by moving the trolley 131 with the chain block 135 mounted thereon to the rear side along the axial path 125, the trolley 131 is moved to the connecting path 129 from the axial path 125. Further, the connecting path 129 which supports the trolley 131 is rotated 90° to cause the connecting path 129 to face the lateral direction Dh. Next, by moving the trolley 131 to the lateral path 121 from the connecting path 129, the trolley 131 is moved in the lateral direction Dh along the lateral path 121. When the trolley 131 reaches the end of the lateral path 121, the chain 137 of the chain block 135 is extended to place the component P within the enclosure 60 in the lateral direction Dh of the gas turbine 10. Next, the wire 139 is detached from the component P, the component P is moved to the outside of the enclosure 60, and the component P is repaired and inspected.

FIG. 17 illustrates a state in which, slier the upper half of the connection cylinder 32 of the intake duct 30 is detached from the intake duct 30, the wire 139 is hooked to a bearing cover 19 (P) of the front bearing 18a of the gas turbine 10, and the wire 139 is hooked to the hook 136 of the chain block 135. Further, FIG. 18 illustrates a state in which the chain 137 of the chain block 135 is wound up to raise the bearing cover 19 (P) so that the lower end of the bearing cover 19 (P) is located above the lower edge of the rear plate opening 36 and the upper edge 14b of the outer casing 14.

As illustrated in FIG. 18, when the component P that is hung by the chain block 135 is moved along the axial path 125, the lower end of the component P needs to be securely located over the lower edge of the rear plate opening 36 and the upper edge 14b of the outer casing 14. Furthermore, the component P is preferably located as high as possible so that the lower end of the component P does not come into contact with the lower edge of the rear plate openings 36 and the upper edge 14b of the outer casing 14 even if the component P is tilted when the component P is moved along the axial path 125. Therefore, the axial path 125 is preferably disposed at as high a position as possible inside the compressor connecting portion 31 of the intake duct 30.

Therefore, in the present embodiment, as illustrated in FIG. 17, the axial beam member 115 located above the axial path 125 is made up of three axial beam members 116, 117, and 118, and the second axial beam member 117 located in the middle in the axial direction Da is shifted downward relative to the other axial beam members 116 and 118. Therefore, in the present embodiment, even if the positions of the upper surface of the first axial beam member 116 and the upper surface of the third axial beam member 118 are higher than the upper edge 36a of the rear plate opening 36, the second axial beam member 117 can be located below the upper edge 36a of the rear plate opening 36. In this way, in the installed state of the hanging device 100, the upper surface of the second axial beam member 117 is lower than the upper edge 36a of the rear plate opening 36, and meanwhile, the upper surface of the first axial beam member 116 and the upper surface of the third axial beam member 118 are higher than the upper edge 36a of the rear plate opening 36.

Incidentally, like the installed state of the hanging device 100, in a state in which the upper surface of the third axial beam member 118 is higher than the upper edge of the rear plate opening 36, the axial path 125 and the axial beam member 115 of the hanging device 100 cannot be inserted into the intake duct 30 from the rear plate opening 36. Therefore, in the inserting process (S5), as previously described with reference to FIGS. 13 and 14, in the state in which the upper edges of the second axial beam member 117 and the third axial beam member 118 are located below the upper edge of the rear plate opening 36 by tilting the hanging device 100 so that the front end of the hanging device 100 is located below the rear end, the axial path 125 and the axial beam member 115 are inserted into the intake duct 30 from the rear plate opening 36.

In the present embodiment, in the course of repair and inspection of the component P, when the hanging device 100 is installed on the lower enclosure 61, the overhead crane 75 is used. However, after installing the hanging device 100, it is possible to move the component P by the hanging device 100, even without using the overhead crane 75. Therefore, in the present embodiment, it is possible to significantly shorten the occupancy time of the overhead crane 75 in the course of repair and inspection of the component P. Furthermore, for example, by simultaneously using the hanging device 100 and the overhead crane 75 of the present embodiment. It is possible to perform the repair and inspection of the exhaust-side components of the gas turbine 10 at the same time as the repair and inspection of the intake-side component P of the gas turbine 10.

Therefore, in the present embodiment, it is possible to shorten the time for repair and inspection processes of the gas turbine 10.

Figure 19:
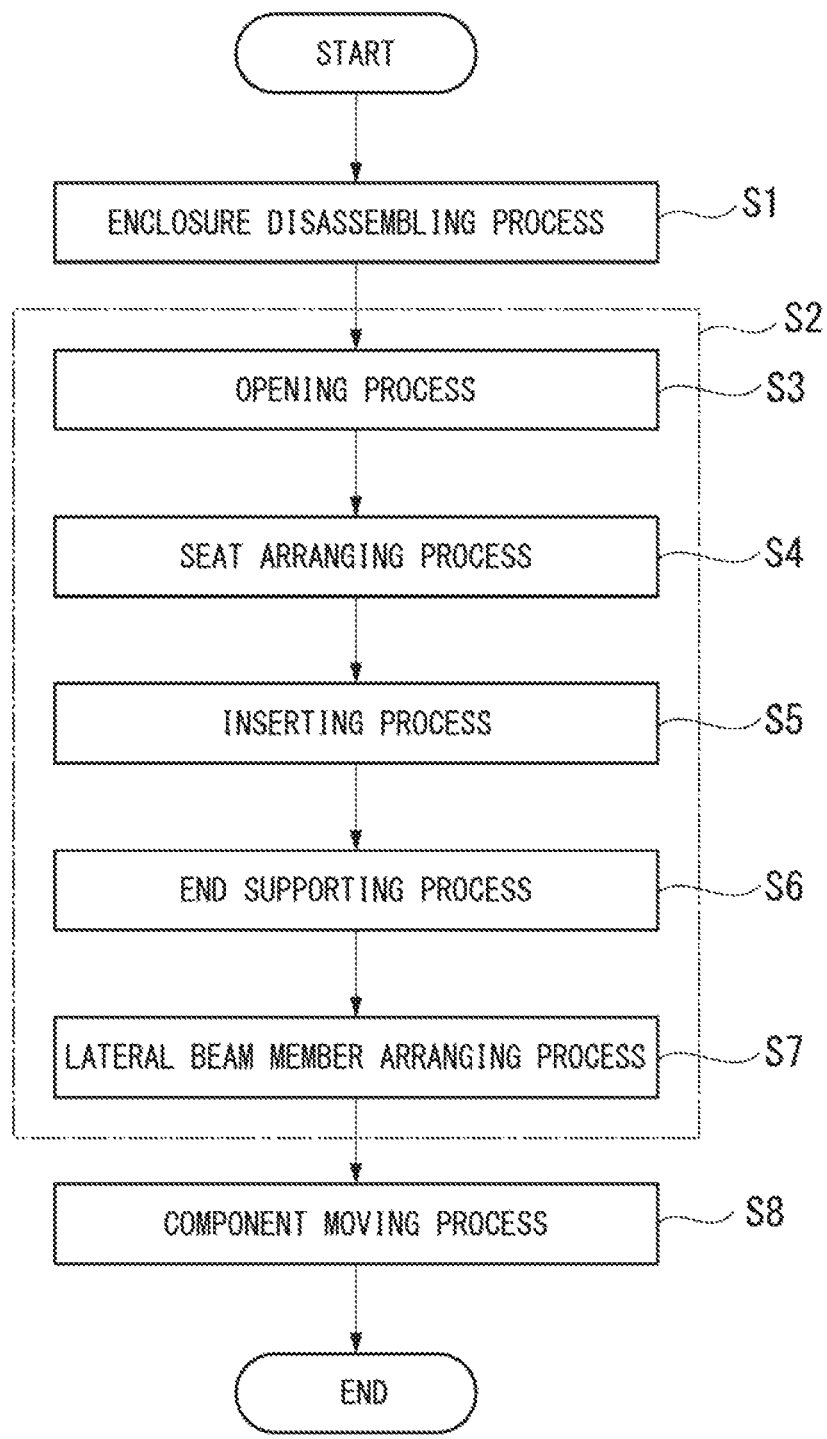
FIG. 19 is a flowchart representing the execution procedure of the method for dismounting the component of the gas turbine in the embodiment according to the present invention.

Although an example of dismounting the component P of the gas turbine 10 has been described, when the dismounted component P is mounted, the processes in the flowchart illustrated in FIG. 19 may be performed in reverse order. However, the process executed at the end in this case is the assembling process of the enclosure 60, rather than the disassembling process of the enclosure 60.

MODIFIED EXAMPLES

In the above-described embodiment, by rotating the linear connecting path 129, the state in which the connecting path 129 is connected to the axial path 125 and the state in which the connecting path 129 is connected to the lateral path 121 are achieved. However, the connecting path 129 may be a fixed type instead of being rotated. In this case, the connecting path 129 may have one end connected to the axial path 125 and the other end connected to the lateral path 121, and may be smoothly curved from one end to the other end.

Further, although an example of dismounting the component P of the gas turbine 10 in the region in which the intake duct 30 is disposed using the hanging device 100 has been described, the components of the gas turbine 10 outside this region, for example, components of the components 21 and the like, may be dismounted using the hanging device 100. In this way, when there is no need to insert a part of the hanging device 100 into the intake duct 30 in dismounting the components of the combustor 21 and the like, the components of the bridge member 110, namely the axial beam member 115, the axial path 125, the connecting path 129, and the rotation supporting member may be omitted.

Further, although the hanging device 100 of the above-described embodiment is provided with the lateral paths 121 on both sides in the lateral direction Dh based on the central portion of the lateral beam member 111 in the lateral direction Dh, the lateral path 121 may be provided only on one side in the lateral direction Dh based on the central portion of the lateral beam member 111, and in some cases, the lateral path 121 may not be provided in the lateral beam member 111.

Although the above-described embodiment is applied to the components of the gas turbine 10, the present invention may be applied to components of a steam turbine.

INDUSTRIAL APPLICABILITY

According to an aspect of the present invention, it is possible to shorten the time required for repair and inspection processes of the turbine.

REFERENCE SIGNS LIST

10 Gas turbine (or simply turbine)
11 Compressor
12 Compressor rotor
13 Compressor casing
14 Outer casing
15 Inner casing
16 Gas turbine rotor
17 Gas turbine casing
21 Combustor
25 Turbine
25 Turbine rotor
27 Turbine casing
30 Intake duel
31 Compressor connecting portion
32 Connection cylinder
33 Front plate
34 Rear plate
35 Rear plate body
36 Rear plate opening
37 Lid
45 Duct vertical portion
46 Duct bent portion
47 Duct horizontal portion
49 Intake air filter device
50 Exhaust duct
55 Generator
60 Enclosure
61 Lower enclosure
62 Front wall plate
63 Rear wall plate 64 Side wall plate
65 Upper enclosure
70 Turbine building
75 Overhead crane
76 Traveling rail
77 Girder
78 Hoist
100 Hanging device
110 Bridge member
111 Lateral beam member
115 Axial beam member
116 First axial beam member
117 Second axial beam member
118 Third axial beam member
119 Connecting path rotation support portion
120 Traveling path
121 Lateral path (traveling path)
125 Axial path (traveling path)
129 Connecting path (traveling path)
130 Hanging tool
131 Trolley
132 Roller
135 Chain block
140 Leg member
141 Leg
142 Leg seat
143 Flange (flange portion)
150 Pedestal
160 Axial beam support seat

The invention claimed is:

1. A hanging device of a component comprising:
  a bridge member that bridges upper ends of a pair of side wall plates facing each other with a turbine interposed therebetween, among plates which constitute an enclosure surrounding an outer periphery of the turbine, and has a traveling path; and
  a hanging tool that hangs the component of the turbine and travels along the traveling path,
  wherein the traveling path at least has a lateral path that extends in a lateral direction in which the pair of side wall plates are arranged and an axial path that extends in an axial direction which is a direction in which a rotational axis of the turbine extends.

2. The hanging device of the component according to claim 1, further comprising:
  a leg member that is disposed on each of the upper ends of the pair of side wall plates, supports the bridge member, and adjusts the height of the bridge member.

3. The hanging device of the component according to claim 2, wherein the leg member has a flange portion that regulates a movement in the lateral direction in which the pair of side wall plates are arranged.

4. The hanging device of the component according to claim 2, further comprising:
  a pedestal which is disposed between the leg member and the upper end of the side wall plate, and of which a central portion in the lateral direction in which the pair of side wall plates are arranged protrudes upward.

5. The hanging device of the component according to claim 1, wherein the traveling path further has a connecting path that connects the lateral path and the axial path such that the hanging tool is movable between the lateral path and the axial path.

6. The hanging device of the component according to claim 5, wherein the lateral path, the axial path, and the connecting path are provided on the same virtual plane, and the hanging device further comprises:
  a connecting path rotation support portion that supports the connecting path so as to be rotatable on an axis perpendicular to the virtual plane around an intersection point between an extension line of the lateral path and an extension line of the axial path.

7. The hanging device of the component according to claim 1, wherein the bridge member has a lateral beam member which extends in the lateral direction in which the pair of side wall plates are arranged and bridges the upper ends of the pair of side wall plates, and to which the traveling path is mounted.

8. The hanging device of the component according to claim 1, wherein the bridge member has a lateral beam member that extends in the lateral direction in which the pair of side wall plates are arranged, and bridges the upper ends of the pair of side wall plates, and an axial beam member which is mounted on the lateral beam member and extends in the axial direction, and to which the axial path is mounted.

9. The hanging device of the component according to claim 8, further comprising:
  an axial beam support seat that is fixed to the inner surface of an intake duct of the turbine to support an end of the axial beam member.

10. A hanging device of a component comprising:
  a bridge member that bridges upper ends of a pair of side wall plates facing each other with a turbine interposed therebetween, among plates which constitute an enclosure surrounding an outer periphery of the turbine, and has a traveling path;
  a hanging tool that hangs the component of the turbine and travels along the traveling path; and
  a leg member that is disposed on each of the upper ends of the pair of side wall plates, supports the bridge member, and adjusts the height of the bridge member,
  wherein the leg member is fixed with the bridge member.

11. The hanging device of the component according to claim 10, wherein the leg member has a flange portion that regulates a movement in a lateral direction in which the pair of side wall plates are arranged.

12. The hanging device of the component according to claim 10, further comprising:
  a pedestal which is disposed between the leg member and the upper end of the side wall plate, and of which a central portion in the lateral direction in which the pair of side wall plates are arranged protrudes upward.

13. The hanging device of the component according to claim 10, wherein the traveling path has a lateral path that extends in the lateral direction in which the pair of side wall plates are arranged.

14. The hanging device of the component according to claim 10, wherein the traveling path has an axial path that extends in the axial direction which is a direction in which a rotational axis of the turbine extends.

15. The hanging device of the component according to claim 10, wherein the traveling path has a lateral path extending in the lateral direction in which the pair of side wall plates are arranged, an axial path extending in the axial direction which is a direction in which the rotational axis of the turbine extends, and a connecting path that connects the lateral path and the axial path such that the hanging tool is movable between the lateral path and the axial path.

16. The hanging device of the component according to claim 15,
  wherein the lateral path, the axial path and the connecting path are provided on the same virtual plane, and
    the hanging device further comprises: a connecting path rotation support portion that supports the connecting path so as to be rotatable on an axis perpendicular to the virtual plane around an intersection point between an extension line of the lateral path and an extension line of the axial path.

17. The hanging device of the component according to claim 10, wherein the bridge member has a lateral beam member which extends in the lateral direction in which the pair of side wall plates are arranged and bridges the upper ends of the pair of side wall plates, and to which the traveling path is mounted.

18. The hanging device of the component according to claim 10, wherein the bridge member has a lateral beam member that extends in the lateral direction in which the pair of side wall plates are arranged, and bridges the upper ends of the pair of side wall plates, and an axial beam member which is mounted on the lateral beam member and extends in the axial direction, and to which the axial path is mounted.

19. The hanging device of the component according to claim 18, further comprising:
    an axial beam support seat that is fixed to the inner surface of an intake duct of the turbine to support an end of the axial beam member.

* * * * *